United States Patent
Lahiri et al.

(10) Patent No.: US 6,877,053 B2
(45) Date of Patent: Apr. 5, 2005

(54) HIGH PERFORMANCE COMMUNICATION ARCHITECTURE FOR CIRCUIT DESIGNS USING PROBABILISTIC ALLOCATION OF RESOURCES

(75) Inventors: Kanishka Lahiri, La Jolla, CA (US); Anand Raghunathan, Plainsboro, NJ (US); Ganesh Lakshminrayana, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 645 days.

(21) Appl. No.: 09/874,323

(22) Filed: Jun. 6, 2001

(65) Prior Publication Data

US 2002/0129181 A1 Sep. 12, 2002

Related U.S. Application Data

(60) Provisional application No. 60/259,218, filed on Jan. 3, 2001.

(51) Int. Cl.[7] .............................................. G06F 13/14
(52) U.S. Cl. ...................... 710/113; 710/240; 710/243; 340/825.5
(58) Field of Search ................................ 710/240, 244, 710/116, 41, 243, 113, 114; 711/147, 154; 709/221; 340/825.5; 370/336, 431; 714/13; 327/19

(56) References Cited

U.S. PATENT DOCUMENTS

| | | | | |
|---|---|---|---|---|
| 4,672,536 A | * | 6/1987 | Giroir et al. ................. | 710/241 |
| 5,088,024 A | * | 2/1992 | Vernon et al. ............... | 710/111 |
| 5,097,483 A | * | 3/1992 | Bechtolsheim ............... | 375/293 |
| 5,862,356 A | * | 1/1999 | Normoyle et al. ........... | 710/116 |
| 6,092,137 A | * | 7/2000 | Huang et al. ................ | 710/111 |
| 6,167,478 A | * | 12/2000 | Bacigalupo .................. | 710/240 |

OTHER PUBLICATIONS

"Priority arbiters" by Bystrov, A.; Kinniment, D.J.; Yakovlev, A. (abstract only).*
"Efficient distributed disk caching in data grid management" By Song Jiang; Xiaodong Zhang (abstract only).*

* cited by examiner

Primary Examiner—Gopal C. Ray
(74) Attorney, Agent, or Firm—Sughrue Mion, PLLC

(57) ABSTRACT

A circuit comprising a plurality of components sharing at least one shared resource, and a lottery manager. The lottery manager is adapted to receive request for ownership for the at least one shared resource from a subset of the plurality of components. Each of the subset of the plurality of components are assigned lottery tickets. The lottery manager is adapted to probabilistically choose one component from the subset of the plurality of components for assigning the at least one shared resource. The probabilistic choosing is weighted based on a number of lottery tickets being assigned to each of the subset of the plurality of components.

20 Claims, 18 Drawing Sheets

HIGH PERFORMANCE COMMUNICATION ARCHITECTURE FOR CIRCUIT DESIGNS USING PROBABILISTIC ALLOCATION OF RESOURCES

I.A. RELATED APPLICATIONS

This Application claims priority from U.S. Provisional Application Ser. No. 60/259,218, filed Jan. 3, 2001, now abandoned.

I.B. FIELD

This disclosure teaches novel techniques related to high-performance architectures for circuit design. The techniques are illustrated using examples of System on Chip (SoC) designs. It should be clear that, though the disclosed techniques are illustrated using SoC designs, the techniques are equally applicable for any kind of circuit.

I.C. BACKGROUND

1. Introduction

The advent of enabling technologies allow integration of entire systems on silicon. This has lead to a proliferation of embedded systems in a variety of application domains that display different design constraints. Example of such design constraints include, but are not limited to, low cost, high performance and low power consumption. There is a simultaneous trend towards shorter system design cycles due to time-to-market pressures, and system customization to meet stringent cost, performance, and power constraints. Because of these demands, it is critical to develop system-level components and architectures that reduce design time while providing sufficient flexibility to be customized to the needs of a wide variety of applications.

Several dimensions must be considered while designing a single chip system that meets goals of performance, power consumption, cost and size. An essential requirement is to efficiently and optimally map an application's functionality to a set of high-performance components for computation and storage. These components include, but not limited to CPUs, DSPs, application specific cores, memories, custom logic, etc. However, the increasing number and heterogeneity of such components, combined with the large volume of data that they may need to exchange, necessitate a second, equally important requirement. That is the design should provide for a communication architecture that provides mechanisms for high speed on-chip (or on-circuit) communication between system components.

2. References

The following papers provide useful background information, for which they are incorporated herein by reference in their entirety, and are selectively referred to in the remainder of this disclosure by their accompanying reference numbers in square brackets (i.e., [3] for the third numbered paper by J. Turner and N. Yamanaka):

[1] "Peripheral Interconnect Bus Architecture." http://www.omimo.be.

[2] "Sonics Integration Architecture, Sonics Inc." http://www.sonicsinc.com.

[3] J. Turner and N. Yamanaka, "Architectural choices in large scale ATM switches," *IEICE Trans. on Communications*, vol. E-81B, February 1998.

[4] "On chip bus attributes specification 1 OCB 1 1.0, On-chip bus DWG" http://www.vsi.org/library/specs/summary.htm.

[5] "Open Core Protocol Specification—version 1.0.", http://www.sonics.com. October 1999.

[6] T. Yen and W. Wolf, "Communication synthesis for distributed embedded systems," in *Proc. Int. Conf. Computer-Aided Design*, pp. 288–294, November 1995.

[7] J. Daveau, T. B. Ismail, and A. A. Jerraya, "Synthesis of system-level communication by an allocation based approach in *Proc. Int. Symp. System Level Synthesis*, pp. 150–155. September 1995.

[8] M. Gasteier and M. Glesner, "Bus-based communication synthesis on system level,"in *ACM Trans. Design Automation Electronic Systems*, pp. 1–11, January 1999.

[9] R. B. Ortega and G. Borriello, "Communication synthesis for distributed embedded systems ," in *Proc. Int. Conf. Computer-Aided Design*, pp. 437–444, November 1998.

[10] K. Lahiri, C. Lakhshminarayana, A. Raghunathan, and S. Dey, "Communication Architecture Tuners: a methodology for the design of high performance communication architectures for system-on-chips," in *Proc. Design Automation Conf.*, June 2000.

[11] N. McKeown, M. Izzard, A. Mekkitikul, W. ellersick and M. Horowitz, "The Tiny Tera: A packet switch core," *IEEE Micro*, vol. 17, pp. 26–33, January 1997.

[12] A. Smiljanic, "Flexible bandwidth allocation in terabit packet switches in *Proc. of Intl. Conf. on Telecommunication*, (Heidelberg, Germany), June 2000.

[13] M. Shreedhar and G. Varghese, "Efficient fair queueing using deficit round robin," in *Proc. of SIGCOMM*, (Boston, Mass.), pp. 231–243, September 1995.

[14] L. Zhang, "Virtual clock: A new traffic control algorithm for packet switching networks," in *Proc. of SIGCOMM*, 1990.

[15] H. Zhang, "Service disciplines for guaranteed performance service in packet-switching networks," *Proc. of IEEE*, vol. 83, October 1995.

[16] A. C. Waldspurger and W. E. Weihl, "Lottery scheduling: Flexible proportional-share resource management," in *Proc. Symp. on Operating Systems Design and Implementation*, (Monterey Calif. (USA)), pp. 1–12, 1994.

[17] D. Wingard and A. Kurosawa, "Integration architecture for system-on-a-chip design," in *Proc. Custom Integrated Circuits Conf.*, pp. 85–88, 1998.

[18] "IBM On-chip CoreConnect Bus Architecture." http://www.chips.ibm.com/products/coreconnect/index.html.

[19] F. Balarin, M. Chiodo, H. Hsieh, A. Jureska, L. Lavagno, C.Passerone, A. Sangiovanni-Vincentelli, E. Sentovich, K. Suzuki and B. Tabbara., *Hardware-software Co-Design of Embedded Systems. The POLIS Approach*. Kluwer Academic Publishers, Norwell, Mass., 1997.

[20] J. Buck and S. Ha and E. A. Lee and D. D. Masserchmitt, "Ptolemy: A framework for simulating and prototyping heterogeneous systems," *International Journal on Computer Simulation, Special Issue on Simulation Software Management*, vol. 4, pp. 155–182, April 1994.

3. Related Work

Recognizing the importance of high-performance communication as a key to successful system design, recent work has addressed several issues pertaining to communication architectures, specifically for on-chip communication architectures.

One body of work addresses the development of on-chip integration and communication architectures. Several system design and semiconductor companies employ proprietary bus architectures. While many of them differ in their detailed implementation, they can be classified into a few categories, based on their structural topologies, and based on the protocols and policies they use to manage access to the shared bus. For example, bus architectures may be flat (single shared bus) or may consist of multiple buses grouped in a hierarchy (interconnected by bridges) in order to achieve higher degrees of parallelism in communication. The protocols commonly employed in SoC bus architectures include priority based arbitration [1], time division multiplexing [2], and token-ring mechanisms[3].

Another body of work is aimed at facilitating a plug-and-play design methodology for HW/SW SoCs by promoting the use of a consistent communication interface, so that predesigned components or cores can be easily integrated with other system components. Several on-chip bus standards are evolving to realize this goal, most notably that put forward by VSIA (Virtual Socket Interface Alliance) [4], and more recently, the Open Core Protocol made available by Sonics Inc [5]. Using standard interfaces is advantageous because (i) it frees the core developer from having to make any assumptions about the system in which the core will be used, (ii) paves the way for developing a variety of novel communication architectures not constrained by specific requirements of each SoC component that it needs to serve, and (iii) facilitates a plug-and-play design methodology, which give system designers access to a library of candidate cores from which to choose one that best suits the system's design goals.

Research on system-level synthesis of communication architectures [6, 7, 8, 9, 10] deals with synthesis of a custom communication architecture topology or protocols that are optimized for the specific application. These techniques typically assume an underlying architectural template that is customized to the specific application at hand.

It bears mentioning that some of the performance issues mentioned earlier have been studied in the networking and telecommunications literature, specifically in the context of traffic scheduling algorithms for switch fabrics [11, 12] and output queues [13, 14] of switches in high speed networks. A survey on scheduling techniques for output queued switches may be found in [15].

While the disclosed techniques have some relationship to work on packet switch architectures for large scale networks, previous research in that context cannot be directly applied to disclosed architectures in question, including system-on-chip design context at least due to the following reasons. Traffic scheduling algorithms need to take care of several issues at the same time, many of which may not be relevant for an application specific system-on-chip. Traffic scheduling algorithms can afford to be more complex, since the time available to make a scheduling decision is a cell time, as opposed to a bus cycle as in the case of on-chip communication; and hence, higher hardware implementation costs can be tolerated. For example, complex hardware techniques to profile the history of communication behavior are employed in determining the currently allocated bandwidth in many traffic scheduling techniques [14]. Also, traffic scheduling techniques are designed to be scalable in the number of flows or ports they can support, while for an SoC, typically the number of communication components or data flows are relatively small in number. This can lead to significantly different design decisions, such as choosing a centralized arbitration algorithm over a distributed one. Other relevant conventional techniques include those used in the context of scheduling multiple threads of computation in a multi-threaded operating system [16]. However, in that domain, while hardware implementation considerations are irrelevant, the software architecture needs to provide for security and insulation between competing applications.

I.D. Background Information on System-on-Chip Communication Architectures

In this sub-section, concepts and terminology used in connection with on-chip communication architectures are introduced. Some commonly used communication architectures are described, highlighting their functionality and architectural features.

1. Synopsis

A communication architecture topology consists of a combination of shared and dedicated communication channels, to which various components are connected. These include (i) components that can drive a communication transaction, or initiate a data transfer, called masters (examples include CPUs, DSPs, DMA controllers etc.), and (ii) components that merely respond to transactions initiated by a master (e.g., on-chip memories), or slaves. When the topology consists of multiple channels, bridges are employed in the communication architecture to interconnect the necessary channels.

Since buses are often shared by several masters, bus architectures come with mechanisms or protocols to manage access to the bus. These mechanisms and protocols are implemented in centralized (or distributed) bus arbiters. Approaches for managing access to a shared resource include round-robin access, priority based selection, and time division multiplexing. It should be noted that, while the discussions may emphasize buses as a shared resource, the disclosed techniques can be applied to any shared resource.

In addition to arbitration, the communication protocol handles other communication functions on each channel. For example, the protocol may limit the maximum number of bus cycles for which a master can use the bus. This is done by setting a maximum burst transfer size.

In addition to the above, another factor that affects the performance of a communication channel is its clock frequency. For a given process technology, the clock frequency of a channel depends on the complexity of the interface logic, the placement of the various components, physical characteristics (capacitance values) and routing of the wires.

2. Popular Examples of Communication Architectures

In this subsection, some popular conventional communication architectures often used in commercial circuit designs are described.

a) Static Priority Based Shared Bus

The shared system bus with a static priority based arbitration protocol is one of the commonly used bus architectures [1]. Such a bus (as shown in FIG. 1) 1.30 is a set of address, data, and control lines that are shared by a set of masters 1.21–1.24 that contend among themselves for access to one or more slaves 1.51–1.54. A centralized bus arbiter 1.10 periodically examines accumulated requests from the various master interfaces, and grants bus access to the master that holds the highest priority among the contending masters 1.21–1.24. The bus also supports a burst mode of data transfer, where the master negotiates with the arbiter to send or receive multiple words of data over the bus without incurring the overhead of handshaking for each word. The maximum size of this transfer is a parameter of the architecture, and is defined along with the various component priorities as shown in FIG. 1. Other parameters that need to be chosen for this architecture include the width of the bus (bytes per word), its frequency of operation, and the address space associated with each slave interface. Some example parameters are shown in 1.40. Several flavors of basic priority based arbitration may be created by combining the basic protocol with one or more enhancements. These include support for pre-emptive transactions, multi-threaded transactions, dynamic bus splitting. etc.

b) Two-level TDMA based architecture

A two-level time division multiplexed access communication architecture is described in [17]. An example of such an architecture is shown in FIG. 2(a). In this conventional architecture, the components are provided access to the communication channel in an interleaved manner, using a two-level arbitration protocol, which is described next.

The first level of arbitration is performed using a timing wheel 2.10 consisting of k slots, where k is greater than (or equal to) the number of masters connected to the communication channel. Each slot in the timing wheel is statically reserved for a unique master from a set of masters M1–M4 shown in 2.20. A master with more than one slot is potentially granted access to the channel multiple times, in a single rotation of the timing wheel. For example, FIG. 2(a) shows a set of reservations where masters $M_2$ and $M_3$ have reserved multiple slots. For a given slot, if the appropriate master interface has an outstanding request, a single word transfer is granted, after which the timing wheel is rotated by one position.

The problem with TDMA based approaches is that of wasted slots. To alleviate this problem, the technique used provides support to a second level of arbitration. If a slot is detected to be idle (no request from the master associated with that slot), the policy is to increment a round-robin pointer from its current position to the next outstanding request. and grant the channel to that master interface for a single word transfer. This ensures that as long as there are outstanding requests, slots will not go unused. FIG. 2(a) shows an example where the current slot is reserved for $M_1$ and $M_1$ has no data to send. The second level round robin pointer rr2 is incremented from its old position at $M_2$ till it finds a non-zero request at $M_4$. The slot is therefore assigned to $M_4$ and rr2 is updated.

To avoid wasting cycles, arbitration is pipelined with word transfers, as shown in FIG. 2(b). For example, while D1 (data from $M_1$) is begin transferred, the next slot's grant is computed as G-2, since $M_2$ has data to send. However, for slots reserved by $M_4$, the arbiter detects that $M_4$ has no requests, and therefore assigns them to $M_1$ and $M_2$, in round-robin sequence. The $6^{th}$ slot is unutilized as there are no pending requests.

In this architecture, the parameters of interest are the number of slots, their reservations (this can be used to assign some components a guaranteed fraction of the channel bandwidth), the width and speed of the channel.

3. Other Conventional Communication Architectures

In addition to the architectures described above, there are several other on-chip communication architectures. Notable among them, is a hierarchical bus architecture, a commercially deployed example of which is IBMs CoreConnect Bus [18]. Such a communication architecture has multiple levels of hierarchy, with bridges connecting buses across hierarchy boundaries. To support cross-hierarchy communications, (initiated by a master on any bus that is connected to the bridge), the bridge must possess multiple master and slave interfaces.

Another common architecture is based on token rings. Ring based on-chip architectures have been used in high speed ATM switches [3]. Notably, their high clock rate makes them an attractive alternative for high-bandwidth applications. In this architecture, a special data word circulates on the ring, which each component interface can recognize as a token. A ring interface which receives a token is allowed to initiate a transaction. If the interface possessing the token has no pending request, it forwards the token to its neighboring member in the ring. If it does have a pending request, the ring interface can write data into the ring (or read data off it), one word per ring cycle, for a fixed number of ring cycles. For each arriving data word, a ring interface must examine the address associated with it to check if it maps into the address space of the slave component to which it is connected.

In addition, each of the basic architectures described above can be implemented with additional features such as pre-emption, multi-threaded transactions, dynamic bus splitting, etc.

I.E. Limitations of Conventional Communication Architectures

In this sub-section, some limitations of the two architectures described in the previous section are illustrated using examples. In particular, the static priority based bus architecture, and the two-level TDMA based architecture are considered. The analysis demonstrates that they are each at least incapable of simultaneously providing (i) proportional allocation of communication bandwidth among various components, and (ii) low latency communications for high priority data transfers.

Experiments illustrating these shortcomings are shown. Reasons for their occurrence are discussed. In section IV D potential benefits of the disclosed communication architecture are discussed, and it is shown that the disclosed architecture is capable of effectively meeting at least both the above goals.

EXAMPLE 1

In this example, the static priority based architecture described in Section I.D.2.(a) is discussed. The manner in which it allocates the bandwidth of the bus to the various components that are connected to it is illustrated. For this experiment, the system shown in FIG. 3(a) is considered. The system consists of a single bus 3.10 with four masters 3.21–3.24, which contend with each other for access to a shared memory 3.30. For this experiment, the bus is always busy, i.e., frequent requests for access to the bus ensure that at any given instant, at least one request from the set of masters is awaiting service. To enforce the bus protocol described in Section I.D.2(a), the bus masters are assigned unique priority values. A priority level 4 is assigned to the component of highest priority, 3 to the next highest, and so on. The fraction of the bandwidth assigned to each component under the given priority assignment was measured over a long simulation trace, in which requests for access to the bus were modeled using stochastic on-chip communication traffic generators. The simulation was repeated for every possible priority assignment, to generate the results shown in FIG. 3(b).

The x-axis in FIG. 3(b) depicts all the possible priority combinations for the four masters that access the bus. For example, the assignment "4321" is interpreted as component $C_1$ having the highest priority, $C_2$ the second highest, etc. Since there are four components, there are 4×3×2×1 or 24 possible assignments. The y-axis denotes a percentage of the total bus bandwidth. The four regions of the graph denote the bandwidth fraction obtained by each master across various priorities. For example, component $C_1$ receives increasing levels of priority from left to right, and exhibits a step-wise increase in the fraction of bandwidth it receives. From FIG. 3(b) the following observations can be made:

The fraction of bandwidth a component receives is extremely sensitive to the priority value it is assigned. For instance, the fraction of the total bus bandwidth assigned to component $C_1$ ranges from 0.16% to 47.8%. Consequently we see that the static priority based arbitration protocol provides no control over the bandwidth fraction assigned to a component.

Low priority components get a negligible fraction of the bus bandwidth as long as higher priority components have pending requests. For example, for priority combinations 1234 through 1432, $C_1$ receives on the average 0.4% of the bus bandwidth. This demonstrates that the static priority based bus architecture cannot allocate a guaranteed fraction of bandwidth to lower priority components. This is because when there are multiple outstanding requests, the architecture grants a large fraction of the bandwidth to the higher priority components, and ends up starving the low priority components.

In the next example r the two-level TDMA based architecture described in Section I.D.2(b) is considered. While the static priority based architecture is not well suited to providing a fixed bandwidth fraction to each component, a time sliced architecture does not suffer from the same drawback. Bandwidth guarantees can easily be enforced by assigning slots in the timing wheel in a manner that is proportional to the bandwidth requirement of the component. For instance, if there are two masters, and bandwidth is to be allocated between them in the ratio 1:2, this can be achieved by assigning ⅓ of the total number of slots in the wheel to the first component, and ⅔ of the slots to the second component. Such an approach effectively solves the problem of proportional bandwidth allocation.

However, the above approach creates another equally serious problem, one that did not exist in the static priority based architecture. While for some applications it may be sufficient to merely ensure guaranteed throughput, for other applications, latency plays an important role in determining overall system performance. However, communication latencies provided by TDMA based architectures can be highly sensitive to the time profile of the communication traffic between components, and the absence of a direct mechanism for prioritizing communication requests can result in high priority transactions being subject to large latencies.

To illustrate the extent of this problem, consider the following illustrative example.

EXAMPLE 2

FIG. 4 shows a segment of two execution traces on a TDMA based bus. The system bus has three masters that contend for access. Slots in the timing wheel are reserved in the manner shown in the first row 4.10 of FIG. 4, with 6 contiguous slots defining the burst size of each component. The second row 4.20 and the fourth row 4.40 depict traces that show two different patterns of communication requests generated by the components, each request marked with the associated component's label. The third row 4.30 and fifth row 4.30 depict waveforms that show the actual assignment of masters to bus slots for the given reservations and request traces. From this example, the following observations can be made:

Notice that in request Trace1, the requests from a particular component arrive periodically, and very well aligned with the slots reserved for it in the timing wheel. Consequently the time spent by a component in waiting for access to the bus is minimal, in this case only 1 slot.

However, under request Trace2, the occurrence of communication requests and the reserved slots are not well synchronized. Even though the request pattern is periodic (in fact, it is identical to request Trace1 except for a phase shift), the wait times encountered by each component request have increased to 13 slots per transaction.

It is possible to optimize the TDMA architecture for request Trace2 by changing the slot reservations. In the example, instead of reserving slots 0–16 for component 1, 7–12 for component 2 etc., reserving 0–16 for 3, 7–12 for 1 and slots 13–18 for 3 would have reduced the waiting time of the Trace2 requests to an average of 1 cycle per request. However, this new assignment will provide poor performance if the request patterns exhibit any dynamic variation. For instance, if they start following the pattern of request Trace1, they will again suffer 13 wait slots on the average per transaction.

From the above example the following conclusions can be drawn. The latency of a communication transaction in a TDMA based architecture is very sensitive to the pattern of requests and the reservations of slots in the timing wheel. When the two are well aligned, the TDMA based architecture can provide extremely low latency communications, whereas if the alignment is skewed, or the arrival patterns are random or unpredictable in nature, the TDMA based architecture may result in large wait times before a requesting component gets access to the bus.

In particular, if a component C needs to transfer a large quantity of data across the bus in order to meet a real time deadline, C may have to wait for every slot that is reserved (and currently used) by other, less important, communications, even though C has a larger fraction of the TDMA slots than others. This causes C to risk missing its deadline.

To obtain a quantitative study of these drawbacks, several experiments were conducted on the TDMA based architecture for various types of communication traffic. The latencies of each communication transaction is measured over a long simulation trace. Several cases where high priority transactions exhibited extremely poor latencies were obtained. As an example, under one class of communication traffic, the highest priority component had an average latency of 18.55 cycles per word, which was more than twice as large as the per word latency of the component with next lower priority. (Details of these experiments are described in Section IV.D).

The teachings of this disclosure is aimed at solving some of the above-identified problems in conventional technologies

II. SUMMARY

According to an aspect of the disclosed techniques, there is provided a circuit comprising a plurality of components sharing at least one shared resource, and a lottery manager. The lottery manager is adapted to receive request for ownership for the at least one shared resource from a subset of the plurality of components. Each of the subset of the plurality of components are assigned lottery tickets. The lottery manager is adapted to probabilistically choose one component from the subset of the plurality of components for assigning the at least one shared resource.

The probabilistic choosing is weighted based on a number of lottery tickets being assigned to each of the subset of the plurality of components.

In a further refinement, the circuit is a system on chip.

In a still further refinement the subset of the plurality of components are system on chip masters that can drive a communication transaction.

In a further refinement the shared resource is a bus.

In a further refinement the shared resource is a communication channel.

In a further refinement an assignment of lottery tickets is based on assigning priorities among the subset of the plurality of components, with a component having a highest priority receiving a maximum number of lottery tickets.

In a still further refinement each component from the subset of the plurality of components has a preassigned share of bandwidth.

In a still further refinement a component from the subset of the plurality of components can request allocation of the bus for transferring multiple words.

In a still further refinement a maximum limit is placed on a number of bus cycles that can be allotted to a component.

In a further refinement operations of the lottery manager are pipelined with actual data transfers to minimize idle bus cycles.

In a further refinement a number of tickets assigned to each of the subset of the plurality of components is statically chosen.

In a still further refinement the number of tickets to be assigned to each of the subset of the plurality of components is stored apriori in the lottery manager.

In a still further refinement the lottery manager further comprises a range calculator, a random number generator, a set of lookup tables, a comparator, and a priority selector. The range calculator is adapted to calculate a range between 0 and a positive number, for each of the components in the subset of the plurality of components, the range corresponding to the number of lottery tickets held by said each of the components. The random number generator is adapted to generate a random number between zero and the positive number. The set of look up tables store ranges calculated for the subset of components. The comparator is adapted to compare the random number with the ranges. The priority selector is adapted to selects a grant component from the subset of components based on the comparison performed in the comparator.

In a still further refinement the positive number is a total number of all lottery tickets held by the subset of components which have pending requests.

In a still further refinement the random number generator is a linear feedback shift register.

In a further refinement a number of tickets assigned to each of the subset of the plurality of components is dynamically chosen.

In a still further refinement, the lottery manager further comprises a bitwise AND calculator, a range calculator, a random number generator, a modulo operator, a comparator and a priority selector. The bitwise AND operator is adapted to receive a set of request lines corresponding to the subset of components and a number of tickets currently possessed by each of the subset of components. The range calculator is adapted to calculate a range between 0 and a positive number, for each of the components in the subset of the plurality of components, the range corresponding to the number of lottery tickets held by said each of the components. The random number generator is adapted to generate a random number. The modulo operator is adapted to perform a modulo operation based on the random number and a sum of the ranges to create a number between zero and the positive number. The comparator is adapted to compare a result of the modulo operation and the ranges. The priority selector is adapted to selects grant component from the subset of components based on the comparison performed in the comparator.

Another aspect of the disclosed techniques, is a method of assigning a shared resource to competing components in a circuit. The method comprises determining priority from among the competing components. Lottery tickets are assigned to the competing components, with a number of lottery tickets being proportional to the priority of the competing components. A components is probablilistically selected based on the number of lottery tickets. The shared resource is assigned to the component.

In a further refinement hybrid static priority technique is used in conjunction with other resource allocation techniques.

In a further refinement time division multiplexing technique is used in conjunction with other resource allocation techniques.

III. BRIEF DESCRIPTION OF THE DRAWINGS

The above objectives and advantages of the present invention will become more apparent by describing in detail preferred embodiments thereof with reference to the attached drawings in which:

FIG. 2($b$) shows a pipelined word level arbitration and data transfer for a two-level time-slice based architecture.

FIG. 3($b$) shows bandwidth sharing among the components of FIG. 3($a$).

FIG. 14($b$) shows variation of communication latencies across different performance of the communication traffic space using an example implementation of the disclosed techniques.

IV. DETAILED DESCRIPTION

IV.A. Overview of Embodiments

Figure 1:
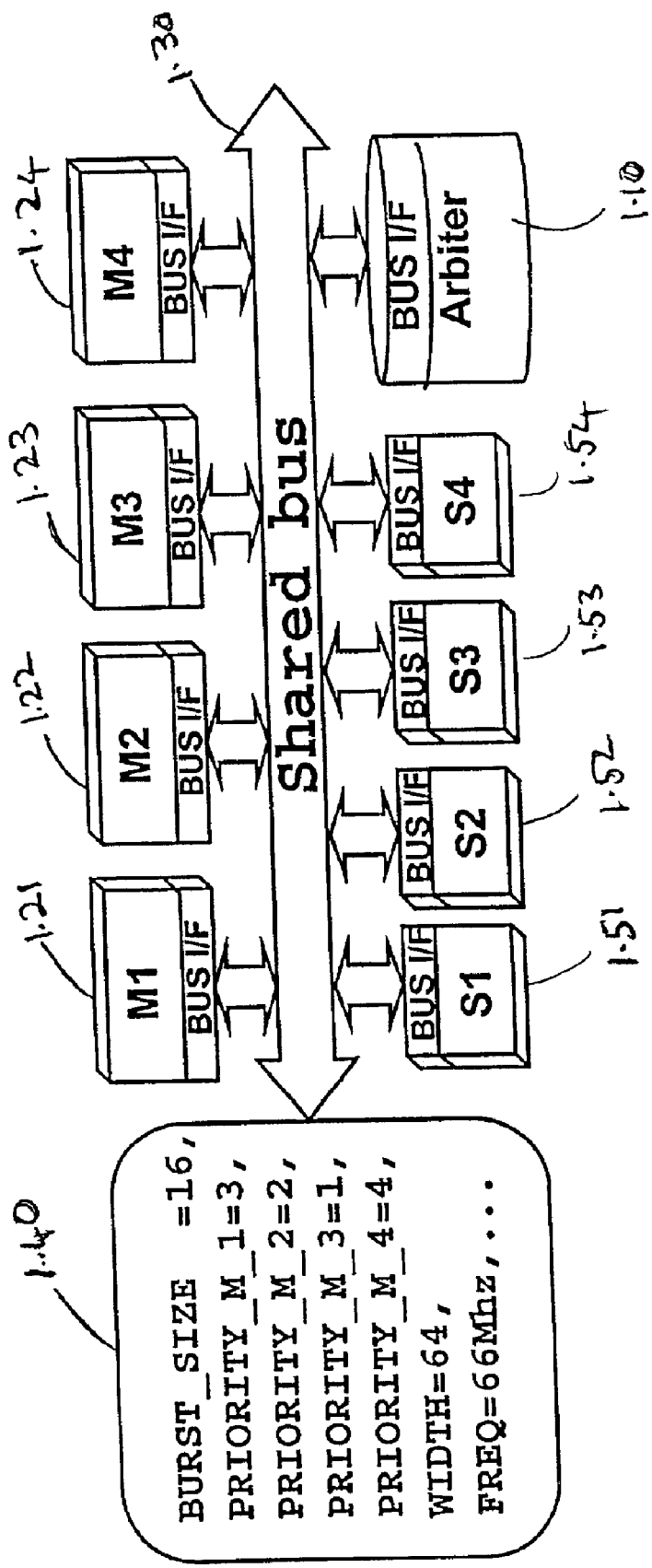
FIG. 1 shows a shared system bus communication architecture with a static priority based protocol.
Figure 2A:
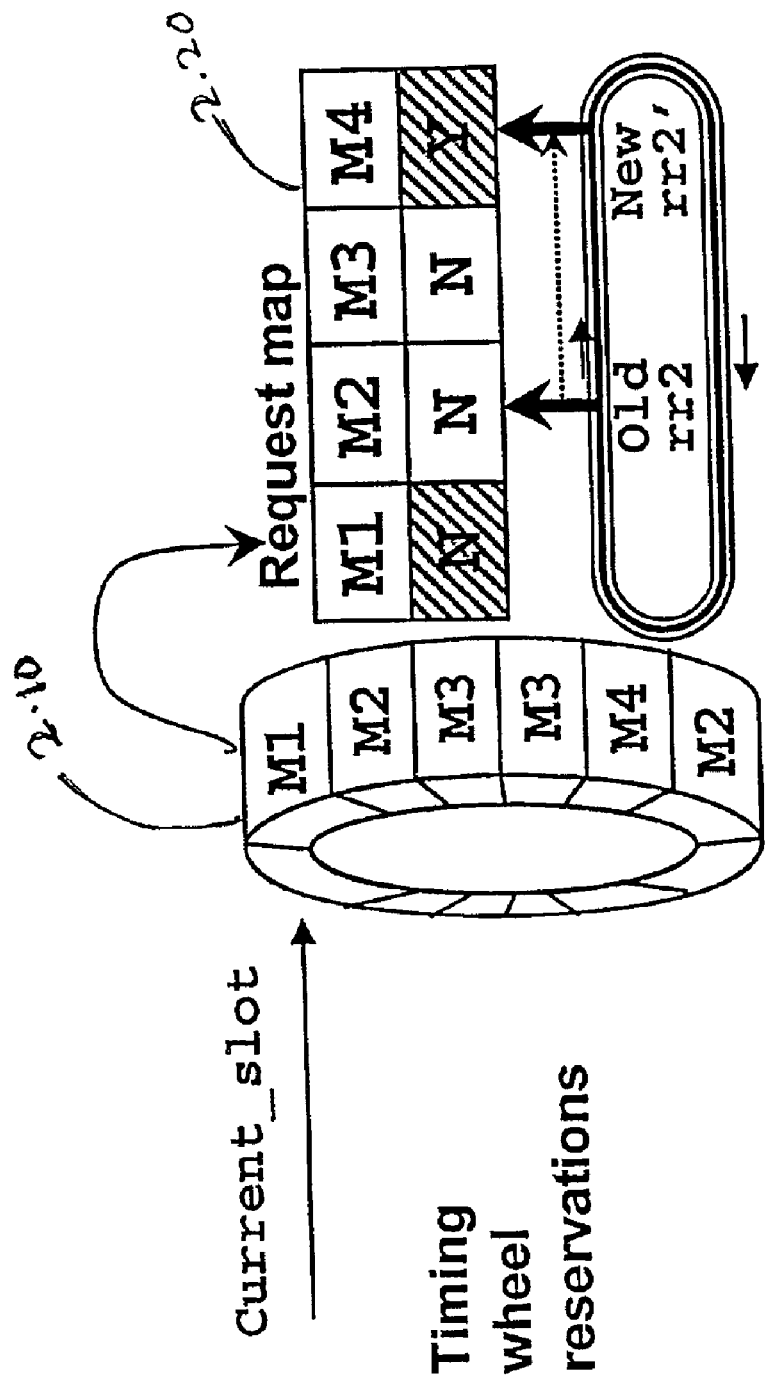
FIG. 2($a$) shows a timing wheel and a second level round robin protocol for a two-level time-slice based architecture.
Figure 2B:
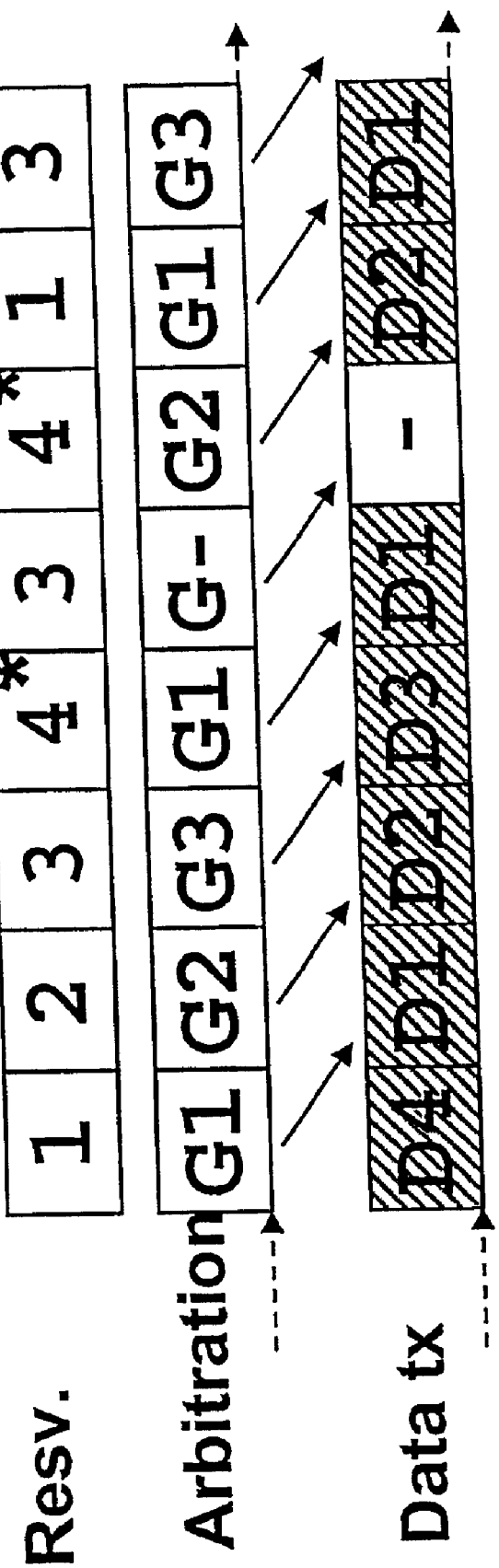

This disclosure describes an example system called LOTTERYBUS, that is a novel high-performance on-chip communication architecture for complex SoC designs that embodies the disclosed techniques. This disclosure also illustrates the advantages that a system that embodies the disclosed techniques provides over conventional technologies. Particularly, such a system provides the designer with fine-grained control over the fraction of communication bandwidth that each system component or data flow receives, while at the same time, such a system provides for fast execution (low latencies) for high priority communications.

It should be noted that the disclosed techniques, embodied in the example LOTTERYBUS architecture, are independent of the topology of the communication architecture. For example, the techniques could be applied to any arrangement of on-chip buses, including a single system wide bus or arbitrarily complex hierarchies. As shown in subsequent sections, some of current on-chip communication architectures mentioned above are not capable of providing control over the allocation of communication bandwidth to SoC components, while others cannot provide low latencies for high-priority communications.

It is believed that the disclosed technique is the first approach for SoC communication architectures that attempts to address the above issues through the use of randomized arbitration decisions. Similar to other communication architectures, the LOTTERYBUS architecture can be used as a template and customized by other system-level synthesis tools.

Herein, it is shown how the LOTTERYBUS architecture is successful in overcoming some of the noted deficiencies in conventional architectures. Two variations of the LOTTERYBUS architecture and their hardware implementations are described. In the first variant, the architectural parameters are statically configured (as is the case with most commercial bus architectures) leading to relatively low control hardware and design complexity. For applications that require greater flexibility and adaptivity in the communication architecture, a variant of the LOTTERYBUS architecture is presented wherein the values of the architectural parameters are allowed to vary dynamically. Such a dynamic variation leads to more intelligent use of the communication architecture at the cost of additional hardware and design complexity.

Experimental results (based on system-level simulations of models of the SoC components, buses and communication interfaces) demonstrate the performance of the proposed architecture across a wide range of communication traffic characteristics. The performance of the architecture, embodying the disclosed techniques, in the cell forwarding unit of an example 4 output ATM switch is also evaluated. The results indicate that the architecture embodying the disclosed technique is successful in meeting its design goals. i.e., providing the designer with control over communication bandwidth allocation, while significantly reducing the latency for high-priority communication traffic (up to 85.4%) over conventional on-chip communication architectures.

IV.B. Illustrative Examples showing Advantageous Capabilities of Systems Embodying Disclosed Techniques In this subsection, the LOTTERYBUS communication architecture, that is an illustrative example implementation embodying the disclosed techniques, is presented. Its ability to (i) provide proportional bandwidth allocation as well as (ii) effectively support high priority traffic with low latencies is demonstrated.

EXAMPLE 3

Figure 5:
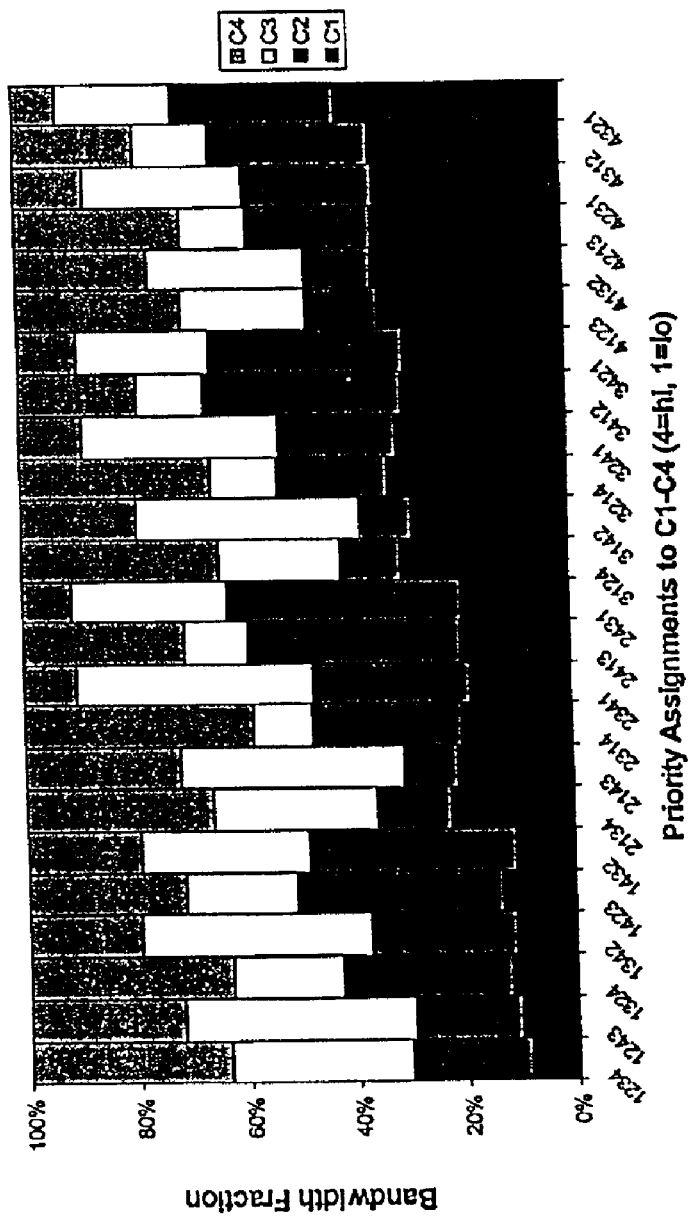
FIG. 5 shows bandwidth sharing among components under a system that embodies the disclosed techniques.

As in Example 1, four components access a single shared bus. In this example also, the relative importance of the communications generated by a component is used to (statically) assign it a "lottery-priority", which in turn determines its communication latencies and allocated bandwidth fraction. The experiments described in Example 1 are repeated using the LOTTERYBUS architecture instead of the static priority based architecture. FIG. 5 depicts the bandwidth fraction obtained by each component for 24 combinations of lottery-priorities. From this figure, it is observed that the fraction of bandwidth obtained by a component is directly proportional to its lottery-priority. For example, under the first 6 priority combinations, component $C_1$ has the lowest lottery-priority, and receives on the average, 11% of the total bus bandwidth. Between combinations 2134 and 2431, it has lottery-priority equal to 2, and therefore receives approximately double, i.e., 20.8% of the total bus bandwidth. The lottery-priorities were set in the ratio 1:2:3:4, to ensure that the lowest priority component receives $$\frac{1}{(1+2+3+4)}$$

or 10% of the total bandwidth, the second lowest 20%, and so on. Therefore the actual allocation closely matches the expected one.

Figure 3A:
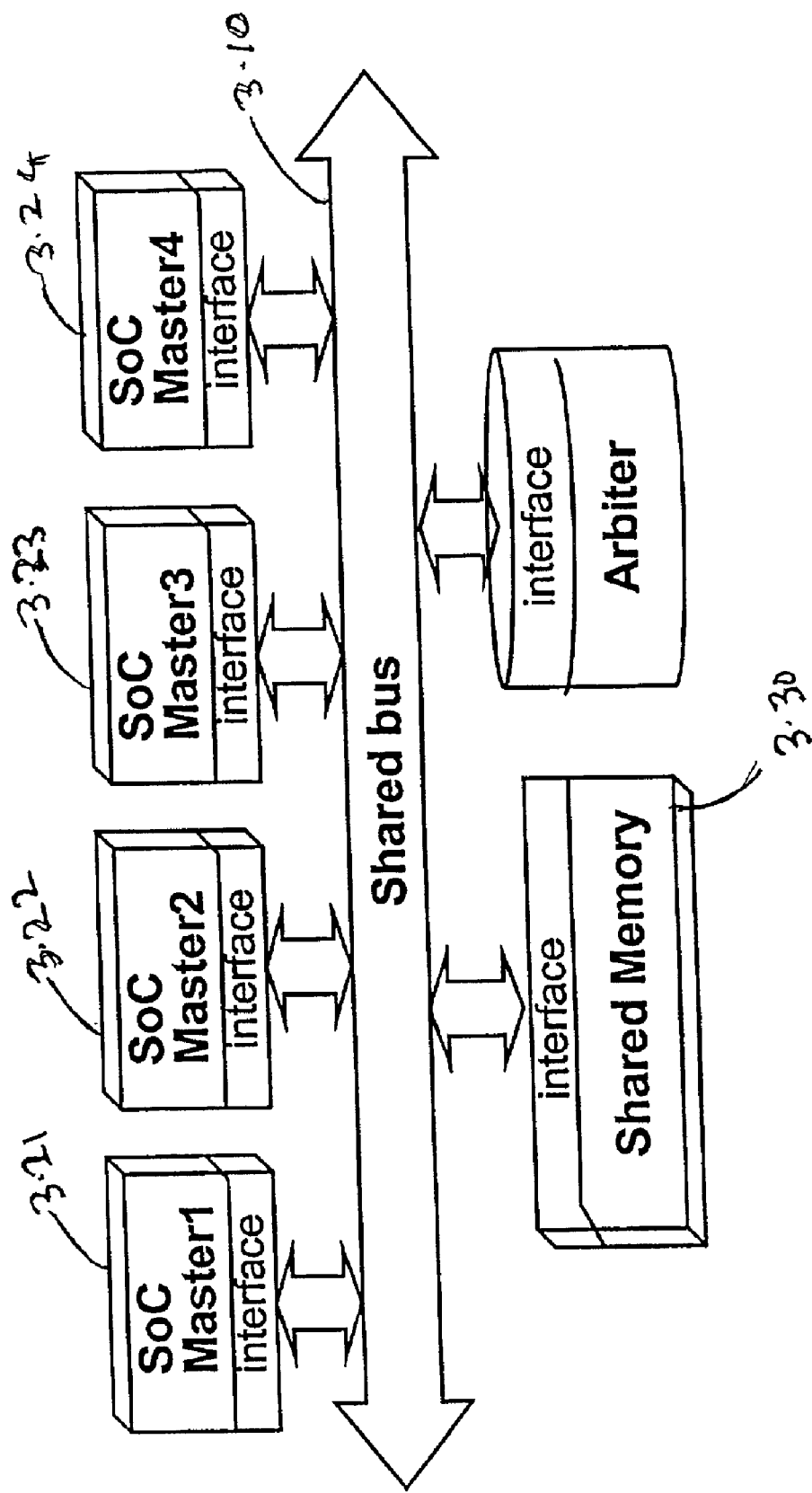
FIG. 3($a$) shows an example system with a single shared bus and 4 contending masters that is used to show bandwidth sharing among SoC components under the static priority based architecture.
Figure 3B:
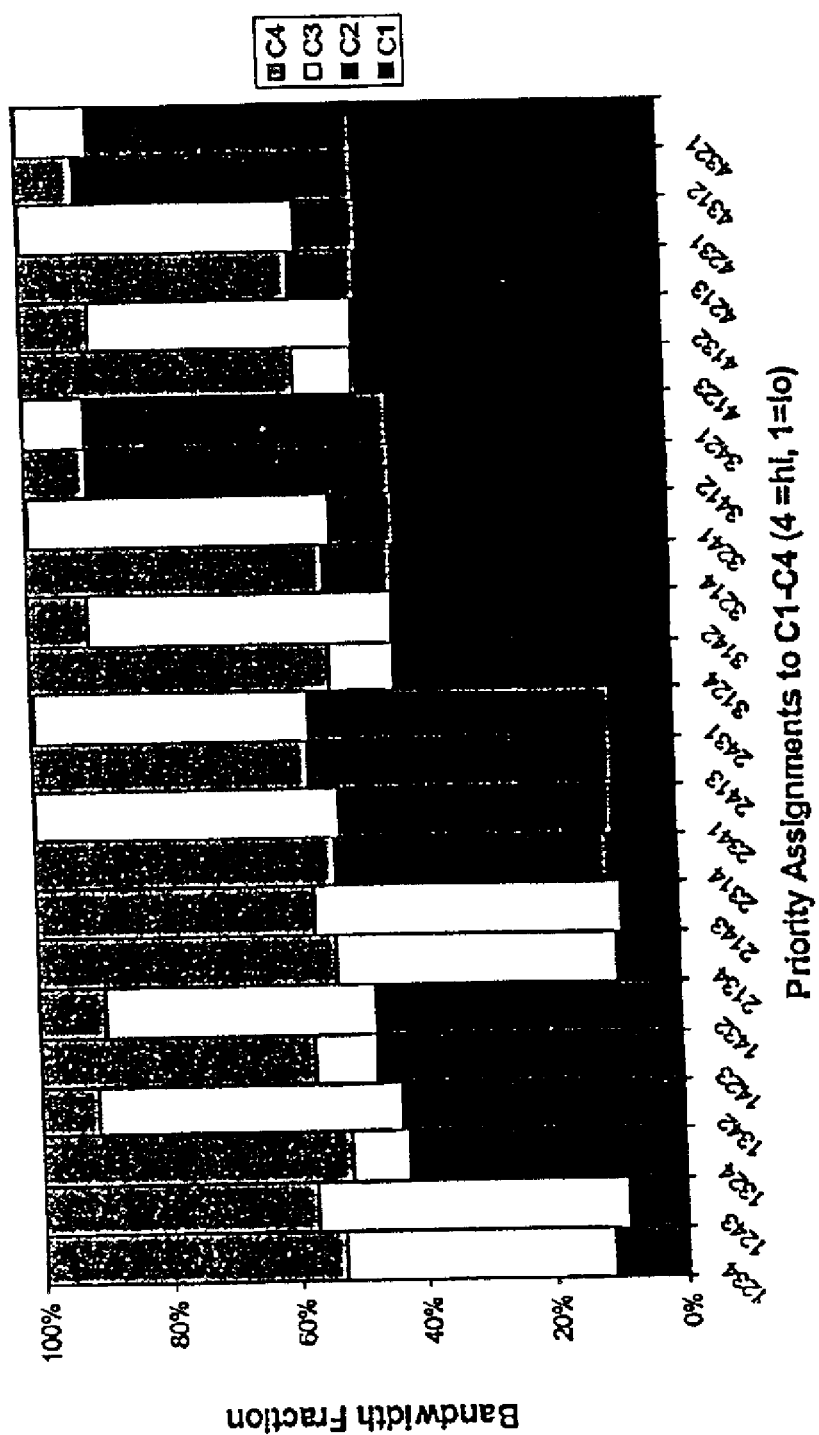
Figure 4:
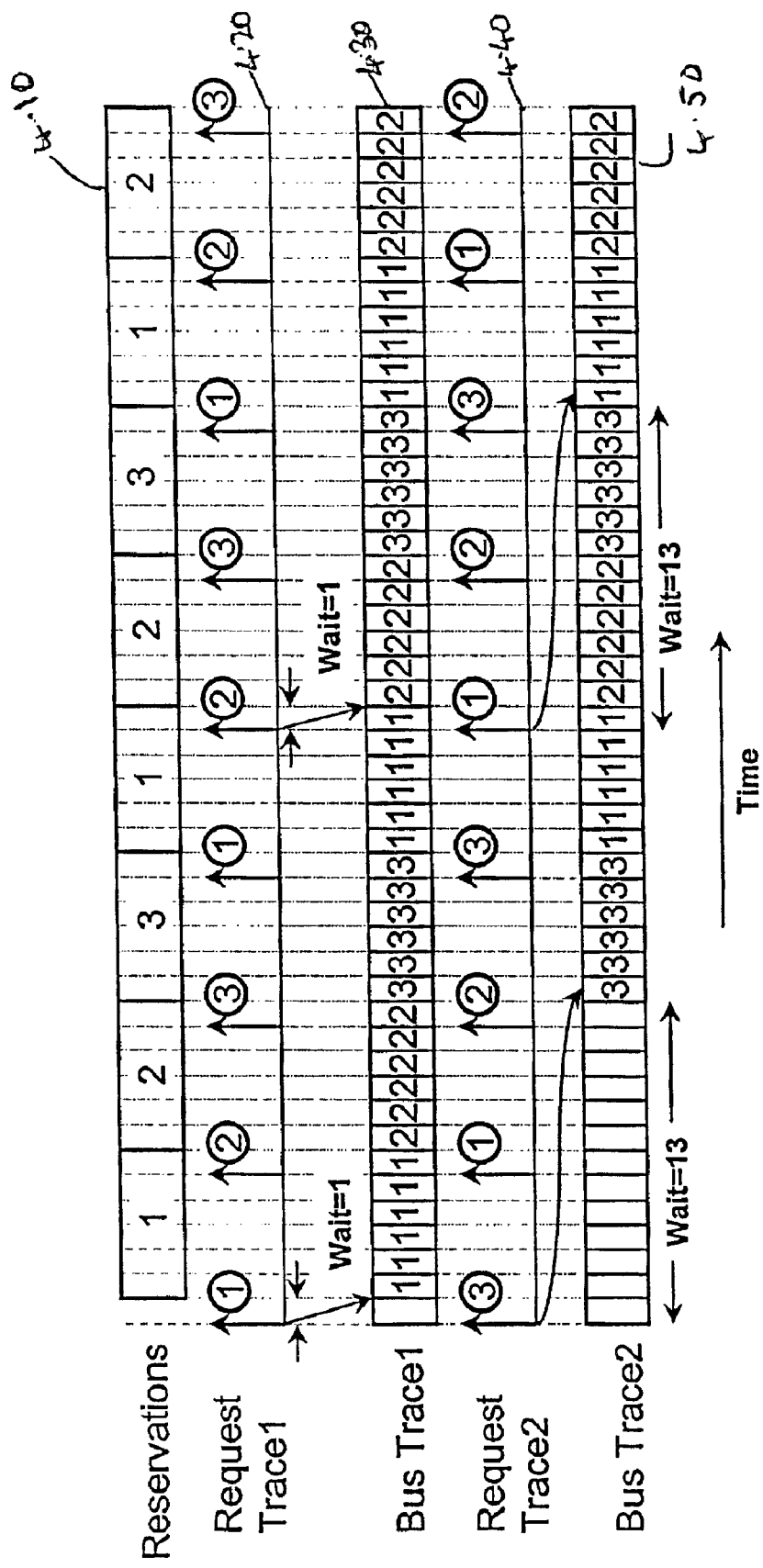
FIG. 4 shows variation of communication latencies under the two-level TDMA based communication architecture.

This shows that the LOTTERYBUS architecture is successful in (i) allocating bandwidth to components in a way that accurately reflects their lottery-priorities, and (ii) preventing skewed distribution of the bus bandwidth when there are simultaneous multiple requests from components of different priorities. By carefully setting the various lottery-priorities, the designer can exercise fine-grained control over the fraction of bandwidth that is assigned to each component. Such fine grained control would not be possible under the more conventional static priority based architecture. For example, assigning each component the same lottery-priority ensures that each component gets an equal share of the bus bandwidth, while assigning the lottery-priorities in a skewed manner could generate a bandwidth distribution similar to that of the static priority based architecture (FIG. 3(b)).

EXAMPLE 4

Figure 6:
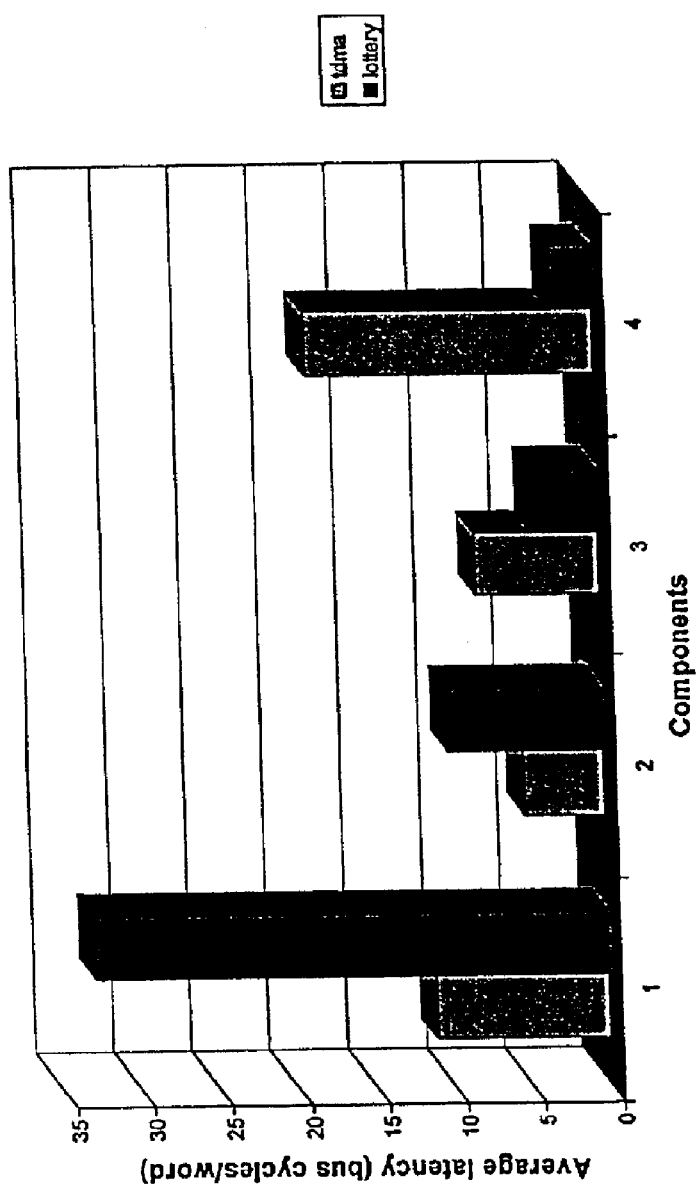
FIG. 6 depicts a comparison of average communication latencies under TDMA and a system embodying the disclosed techniques.

Finally, the ability of the LOTTERYBUS architecture to provide low latency communications to high priority burst data transfers is illustrated. The experiments described in Example 2 were repeated for the LOTTERYBUS architecture, and comparative results for an illustrative class of communication traffic are shown in FIG. 6. The histogram compares the average latency of communications by each component (each having different priorities) across the two implementations of the communication architecture. The x-axis denotes the 4 different priority levels assigned to the four components. For each point on the x-axis, the columns compare the average number of bus cycles spent in transferring a single bus word (including time spent in acquiring and using the bus). The communication traffic for this experiment consisted of regular small requests for access to the bus from the lower priority components, and occasional bursty demands from the high priority components. From this figure, it can be observed that the latency of the highest priority component is substantially lower under the LOTTERYBUS architecture than under the TDMA based architecture. While the average latency under the TDMA architecture was 18.55 cycles per word, the same tinder the LOTTERYBUS architecture was 2.7 cycles/word, which represents a 7× improvement.

The above example demonstrates that in addition to being able to provide proportional bandwidth allocation to each component, the LOTTERYBUS architecture is also well suited to providing low latencies for communication traffic that consists of latency constrained high priority data transfers.

IV.C. Detailed Description of a Communication Architecture Embodying the Disclosed Techniques In this section, the example LOTTERYBUS communication architecture for SoC designs is described. The overall architecture is first described, highlighting its functionality. Then the advantages that it provides are discussed. Two different alternatives for implementing the LOTTERYBUS architecture and the hardware details of each implementation are then discussed.

1. Overview

In this subsection, an overview of the LOTTERYBUS architecture is presented. The disclosed architecture for LOTTERYBUS does not presume any fixed topology of communication channels. Rather, the various components may be interconnected by an arbitrary network of shared channels or a flat system-wide bus. The disclosed architecture consists of a randomized arbitration algorithm that is implemented in a centralized lottery-manager 7.10 for each channel (or bus) 7.20 in the system-on-chip.

Figure 7:
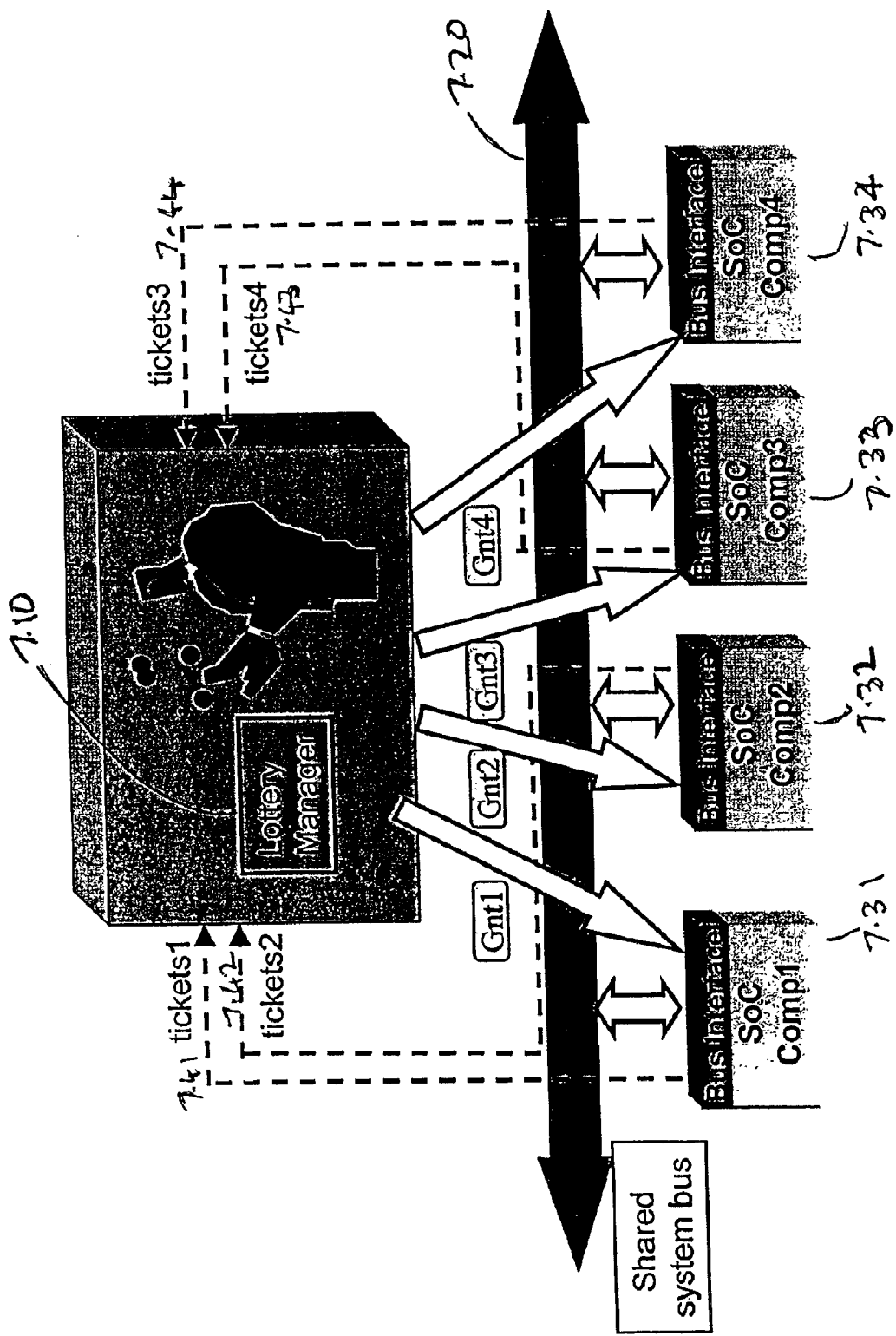
FIG. 7 shows an architecture of an example system that embodies the disclosed techniques.

The lottery-manager 7.10 accumulates requests for ownership of the bus from one or more masters 7.31–7.34, each of which is (statically or dynamically) assigned a number of lottery "tickets" 7.41–7.44 (or priorities), as shown in FIG. 7. The manager probabilistically chooses one of the contending masters to be the "winner" of the lottery, favoring masters that have a large number of tickets (are of high priority), and grants access to that master for a certain number of bus cycles. Multiple word requests may be allowed to complete without incurring the overhead of a lottery drawing for each bus word. However, to prevent a master from monopolizing the bus (in case it has a large amount of data to send), a maximum transfer size (burst_size) limits the number of bus cycles for which the granted master can utilize the bus (this is similar to the static priority based architecture). Also, the architecture pipelines lottery-manager operations with actual data transfers, to minimize idle bus cycles.

The disclosed architecture (as borne out by later experiments) brings two advantages over existing communication architectures. While the conventional TDMA based architecture is successful in allocating bandwidth in a fair and uniform manner, it is not always capable of guaranteeing low communication latencies to high priority burst data transfers. However, the conventional static priority based architecture with burst mode of transfer (as described in Section I.D.2(a)) is capable of satisfying the latter requirement, but is not well suited to providing proportional bandwidth allocation. The LOTTERYBUS architecture embodying the disclosed techniques, among other advantages, combines the merits of both.

By probabilistically choosing one component over another, the LOTTERYBUS architecture ensures fair and proportional bandwidth allocation, and provides appropriate hooks to exercise fine-grained control over the fraction of bandwidth handed out to each component. Also, by supporting explicit priority assignments and a burst mode of transfer, it is capable of providing high bandwidth low latency communications to high priority transactions.

Within the overall scope of the disclosed techniques, two further refinements embodied in two more detailed architectures are disclosed. In the first case, the number of tickets assigned to a component is statically chosen. Consequently the "lottery-manager" can hardwire the number of tickets owned by each component, and at every lottery, the lottery manager need only to know which masters have pending bus access requests.

In the second architecture, the number of tickets a component possesses varies dynamically, and is periodically communicated by the component to the "lottery manager". Although similar in the overall strategy, the two differ significantly in design complexity. The former provides for a simpler architecture, whose complexity is comparable to other architectures like those discussed in Section I.D.2. However, the need for dynamic assignment of lottery tickets may arise in certain applications with stringent real time constraints and highly time-varying characteristics of on-chip communication traffic.

The dynamic LOTTERYBUS architecture has the potential to significantly improve system performance at the cost of additional design complexity. In the next subsection, the principle on which both the architectures operate is presented. Subsequently, details of each architecture is presented in turn.

2. Principle of Operation

The LOTTERYBUS architecture is based on a centralized lottery-manager that takes as inputs a set of requests (one per master) and the number of tickets held by each master. It then outputs a set of grant lines (again one per master) that indicate the number of words that the currently chosen master is allowed to transfer across the bus. The arbitration decision is based on a lottery. The lottery-manager periodically (typically, once every bus cycle) polls the incoming request lines to see if there are any pending requests. If there is only one request, a trivial lottery results in granting the bus to the requesting master. If there are two or more pending requests, then the master to be granted access is chosen in the following manner.

Let the potential contenders be $C_1, C_2, \ldots, C_n$, where n is the total number of bus masters. Let the number of tickets held by each master be $t_1, t_2, \ldots, t_n$. At any bus cycle, let the set of pending bus access requests be represented by a set of boolean variables $r_i$, (i=1, 2, ... n), where $r_i=1$ if component $C_i$ has a pending request, and $r_i=0$ otherwise. The master to be granted is chosen in a randomized way, favoring the component with larger number of tickets. The probability of granting component $C_i$ is given by $$P(C_i) = \frac{r_i \cdot t_i}{\sum_{j=1}^{n} r_j \cdot t_j}$$

Figure 8:
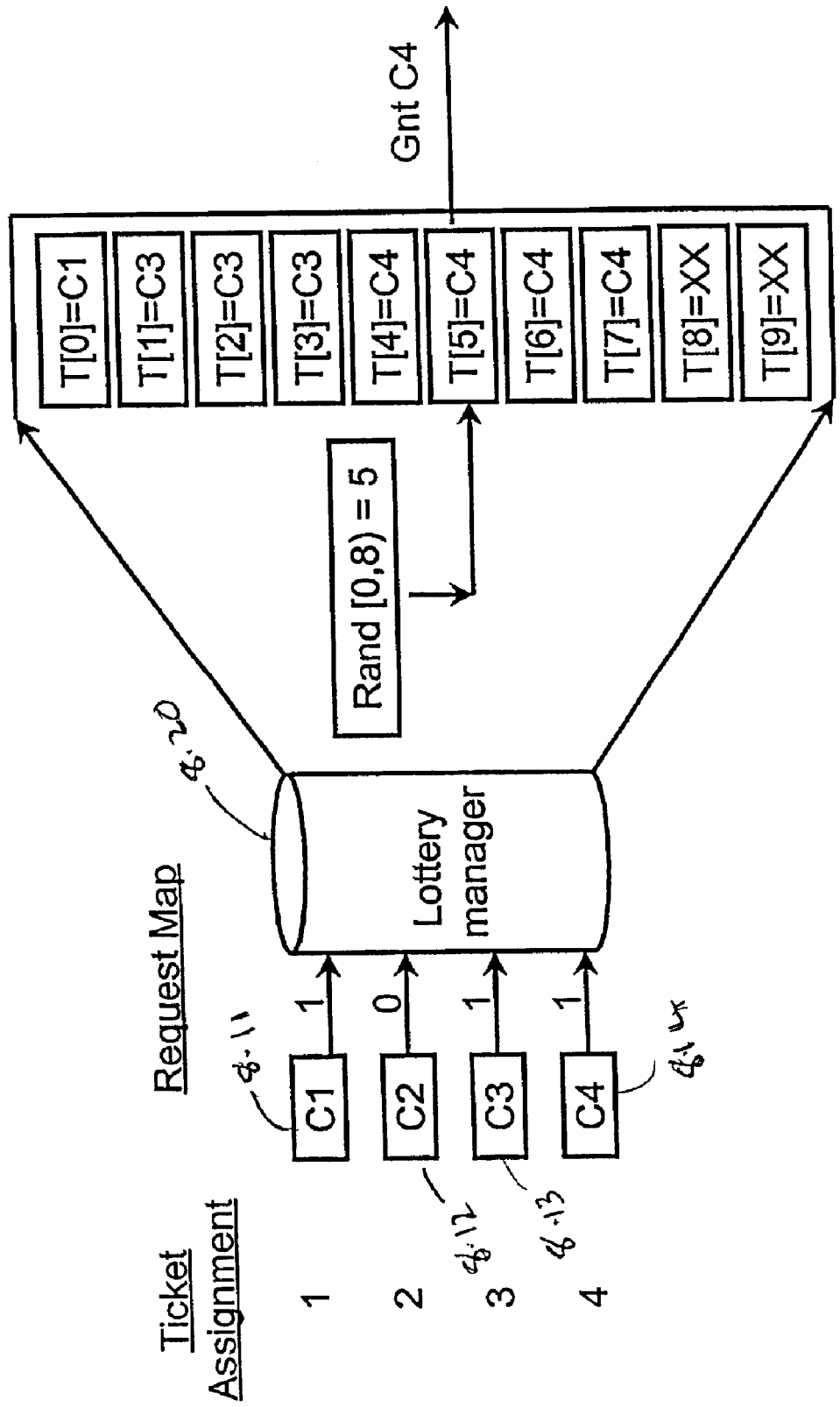
FIG. 8 shows an example of a lottery operation to determine a bus master.

FIG. 8 shows an example where three masters 8.11, 8.13 and 8.14 (corresponding to components $C_1$, $C_3$ and $C_4$) make contending requests, with tickets in the ratio 1:3:4, to the lottery manager 8.20. In such a case, the probability of granting $C_1$ is 0.12, $C_2$ is 0, $C_3$ is 0.37, and $C_4$ is 0.5.

To implement this probabilistic arbitration mechanism, a notion of a lottery is used. General background on a lottery is provided in [16]. To make an arbitration decision, the lottery manager examines the total number of tickets possessed by all the contending components, given by $\Sigma_{j=1}^{n} r_j \cdot t_j$. It then generates a random number (or picks a winning "ticket") from the range $[0, \Sigma_{j=1}^{n} r_j \cdot t_j)$ to determine which component to grant the bus to. It should be noted that, the notation [a, b] denotes a closed interval, which includes all the integers between a and b, inclusive of both a and b. The notation (a, b) defines an open interval, which does not include the end points a and b. The notation [a,b) denotes a closed-open intervan, which includes a but not b.

If the number falls in the range $[0, r_1 \cdot t_1)$, the bus is granted to component $C_1$, if it falls in the range $[r_1 \cdot t_1, r_1 \cdot t_1 + r_2 \cdot t_2)$, it is granted to component $C_2$, and so on. In general, if it lies in the range $[\Sigma_{k=1}^{i} r_k \cdot t_k, \Sigma_{k=1}^{i+1} r_k \cdot t_k)$, it is granted to component $C_{l+1}$. The component with the largest number of tickets occupies the largest fraction of the total range, and is consequently the most likely candidate to receive the grant, provided the random numbers are uniformly distributed over the interval $[0, \Sigma_{j=1}^{n} r_j \cdot t_j)$. For example, in FIG. 8, components $C_1$, $C_2$, $C_3$ and $C_4$ are assigned 1, 2, 3 and 4 tickets respectively. However, at the instant shown, only $C_1$, $C_3$ and $C_4$ have pending requests, hence the number of current tickets $\Sigma_{j=1}^{n} r_j \cdot t_j = 1+3+4 = 8$. Therefore, a random number is generated uniformly in the range [0,8). In the example, the generated random number is 5, and lies between $r_1 \cdot t_1 + r_2 \cdot t_2 + r_3 \cdot t_3 = 4$, and $r_1 \cdot t_1 + r_2 \cdot t_2 + r_3 \cdot t_3 + r_3 \cdot t_4 = 8$. It therefore indexes to a ticket owned by component $O_4$, according to the rule described above, and as illustrated in FIG. 8. Therefore the bus is granted to component $0_4$.

An asymptotic bound on the number of lotteries a component $C_i$ must participate in, before it receives a grant for access to the communication fabric, is next derived. To perform a worst case analysis, it is pessimistically assumed that at every lottery, all the components have outstanding requests, i.e., $r_i=1$, $\forall i=1,2,\ldots,n$. Then, the total number of tickets is given by $T = \Sigma_{j=1}^{n} r_j \cdot t_j = \Sigma_{j=1}^{n} t_j$. If $t_i$ is the number of tickets held by component $C_i$, the probability that $C_i$ receives a grant by the $k^{th}$ lottery is given by the following:

$$p(t_i, T, k) = \frac{t_i}{T} + \left(1 - \frac{t_i}{T}\right)\frac{t_i}{T} + \ldots \left(1 - \frac{t_i}{T}\right)^{k-1}\frac{t_i}{T} = \frac{t_i}{T} \times \sum_{n=0}^{k-1}\left(1 - \frac{t_i}{T}\right)^n$$

Figure 9:
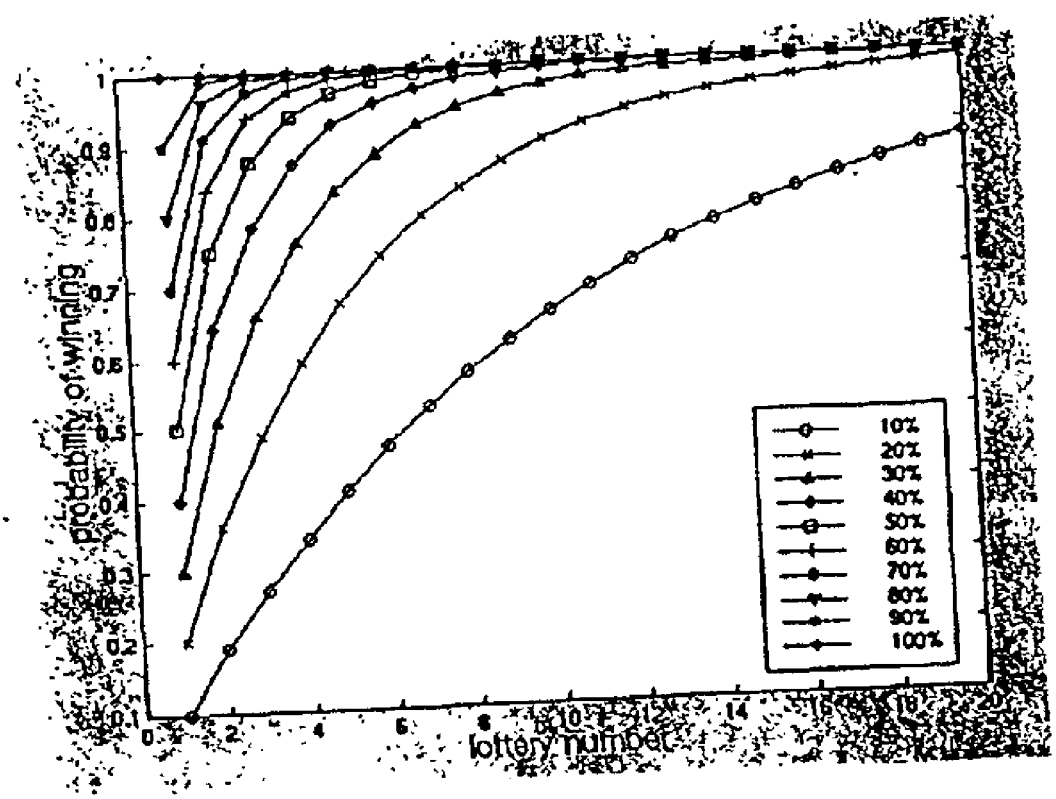
FIG. 9 shows a family of curves for different ticket holding rates and the number of lotteries before a component gets access to the channel

FIG. 9 indicates a family of curves for different ticket holding ratios. When a component holds all the available tickets (the curve indicated by 100%), it is guaranteed to win the very first lottery. In general, the lottery number at which a component wins for the first time is a geometrically distributed random variable, with parameter $$\frac{t_i}{T}.$$

Consequently, the expected number of lotteries before component $C_i$ receives a bus grant is $$\frac{T}{t_i}.$$

Once granted, the master is allowed to transfer at most burst size number of words, after which it needs to post a new access request. If the request size is smaller than the burst size, then the value of the grant is the same as the requested number of words.

3. Hardware Implementation: Statically assigned tickets

In this subsection, an example hardware architecture of a lottery-manager that supports statically assigned lottery tickets is presented. The operation of the lottery-manager can be broken into the following steps:

Calculation of the range $[0, \Sigma_{j=1}^{n} r_j \cdot t_j)$, which is the total number of tickets held by components with currently pending requests. The range varies dynamically, depending on which masters are contending for access to the bus ($r_i=0$ when $C_i$ has no pending request). The largest range is obtained when all the masters have pending requests (all $r_i=1$). In fact, all the intermediate sums $r_1 \cdot t_1, r_1 \cdot t_1 + r_2 \cdot t_2, \ldots \Sigma_{j=1}^{n} r_j \cdot t_j$, are required by the lottery hardware in order to detect the winner.

Random number generation in the range $[0, \Sigma_{j=1}^{n} r_j \cdot t_j)$;

Comparison for grant generation.

Figure 10:
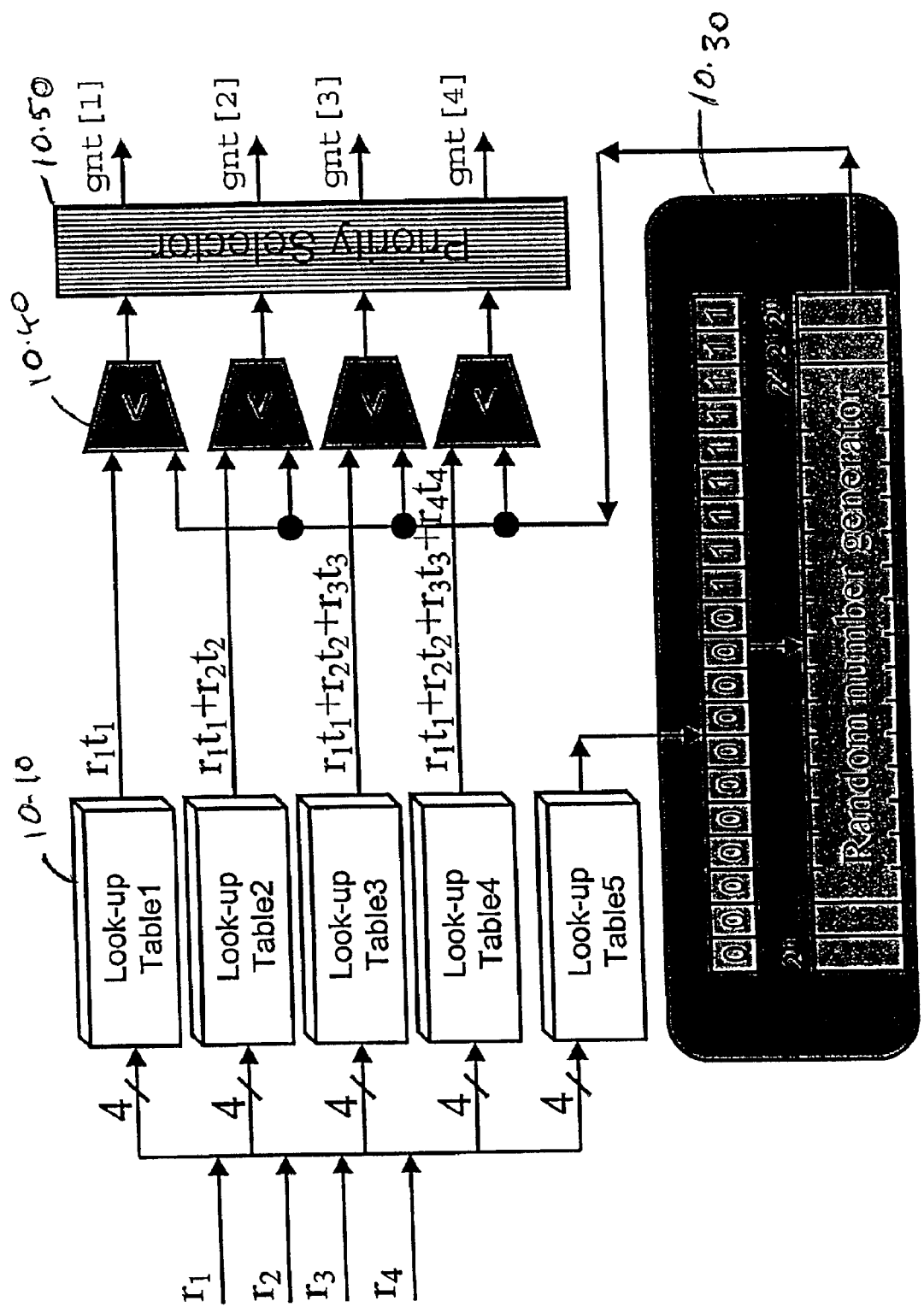
FIG. 10 shows an example lottery manager for an implementation of the disclosed techniques with statically assigned tickets.

An example hardware implementation of the lottery-manager with statically assigned tickets is presented in FIG. 10. Herein, we describe how each of the above issues are addressed by this example architecture.

Precompute Ranges: Since the tickets are statically assigned, it is possible to precompute all the possible ranges to avoid the extra cost of calculating the ranges in hardware. For four masters (not shown in the figure), a 4 bit request map $r_1r_2r_3r_4$ 10.20 indicates which components have pending requests. The 16 possible values of this vector represents all possible combinations of requests. For example, $r_1r_2r_3r_4=1011$ implies $C_1$, $C_3$ and $C_4$ have pending requests. For a given request map and component, the range of tickets owned by the component is determined statically, and stored in a set of look-up tables, one of which is marked 10.10.

FIG. 10 shows the architecture where the request map indexes into a set of look-up tables, one for each component in the circuit. The output of the $k^{th}$ look-up table is the partial sum $\Sigma_{j=1}^{k} r_j \cdot t_j$. As an example, for the ticket assignment of FIG. 7, the look-up table entries are shown in Table 1(a). It is clear that the sizes of the look-up tables need not be identical for different components. For example, look-up Table 1 has just two distinct entries, and needs to be indexed by a single bit ($r_1$). If $r_1=0$ then the table output is 0, else it is the is the number of tickets held by $C_1$, which in this example is 1. Look-up Table 2 has 4 distinct entries, and is indexed by bits $r_1r_2$, while Table 3 and Table 4 have 8 and 16 entries, and are indexed by $r_1r_2r_3$ and $r_1r_2r_3r_4$ respectively.

Efficient Random Number Generation: Herein, a technique to improve the efficiency of the random number generator 10.30 is shown. To facilitate efficient random number generation/selection, the following constraint is added. The total range (given by the sum of the tickets held by components with pending requests) must be a power of 2. In other words, it is ensured that all the entries in look-up Table 4 are powers of two. This is done by scaling the ticket holdings by an appropriate constant such that $\Sigma_{i=1}^{n} r_i \cdot t_i = 2^c$ for some constant c. This calls for scaling of the corresponding entries in other look-up tables as well by the same constant. However, rounding off may lead to slight deviations from

TABLE 1

Look-up tables for randomization in static LOTTERYBUS architecture

| Req map $r_1 r_2 r_3 r_4$ | Table 1 $t_1$ | Table 2 $t_1 + t_2$ | Table 3 $t_1 + t_2 + t_3$ | Table 4 $t_1 + t_2 + t_3 + t_4$ | Req map $r_1 r_2 r_3 r_4$ | Table 1 $t_1$ | Table 2 $t_1 + t_2$ | Table 3 $t_1 + t_2 + t_3$ | Table 4 $t_1 + t_2 + t_3 + t_4$ |
|---|---|---|---|---|---|---|---|---|---|
| 0000 | 0 | 0 | 0 | 0 | 0000 | 0 | 0 | 0 | 0 |
| 0001 | 0 | 0 | 0 | 4 | 0001 | 0 | 0 | 0 | 16 |
| 0010 | 0 | 0 | 3 | 3 | 0010 | 0 | 0 | 16 | 16 |
| 0011 | 0 | 0 | 3 | 7 | 0011 | 0 | 0 | 7 | 16* |
| 0100 | 0 | 2 | 2 | 2 | 0100 | 0 | 16 | 16 | 16 |
| 0101 | 0 | 2 | 2 | 6 | 0101 | 0 | 5 | 5 | 16* |
| 0110 | 0 | 2 | 5 | 5 | 0110 | 0 | 6 | 16 | 16* |
| 0111 | 0 | 2 | 5 | 9 | 0111 | 0 | 3 | 9 | 16* |
| 1000 | 1 | 1 | 1 | 1 | 1000 | 16 | 16 | 16 | 16 |
| 1001 | 1 | 1 | 1 | 5 | 1001 | 3 | 3 | 3 | 16* |
| 1010 | 1 | 1 | 4 | 5 | 1010 | 4 | 4 | 16 | 16 |
| 1011 | 1 | 1 | 4 | 8 | 1011 | 2 | 2 | 8 | 16 |
| 1100 | 1 | 3 | 3 | 3 | 1100 | 5 | 16 | 16 | 16* |
| 1101 | 1 | 3 | 3 | 7 | 1101 | 2 | 6 | 6 | 16* |
| 1110 | 1 | 3 | 6 | 6 | 1110 | 3 | 8 | 16 | 16* |
| 1111 | 1 | 3 | 6 | 10 | 1111 | 2 | 5 | 10 | 16* |
| (a) Original look-up tables | | | | | (b) Transformed look-up tables | | | | | the original ticket proportions held by the components. To illustrate such transformation, Table 1(a) and Table 1(b) show the look-up tables before and after a scaling transformation where all the entries in Table 4, (containing the sum of all current tickets) are scaled to 16. Rows marked with an asterisk are those in which the ticket proportions are not exactly in the ratio 1:2:3:4, but suffer from minor round-off errors. For example, for the request map $r_1 r_2 r_3 r_4 = 1111$, while the original probabilities of granting $C_1, C_2, C_3, C_4$ were 0.1,0.2,0.3,0.4 respectively, after scaling, the modified probabilities are 0.12,0.19,0.31,0.37 respectively. Note that if the desired power of 2 is different for different request maps, the tables could potentially be of the same size, with at most 16 entries in each.

The advantage of scaling the ticket assignments in this manner is to ensure that the random number is always in the correct range without performing a modulo operation. In the example, the random number hardware need only generate 4 bit random numbers. However, in order to achieve more exact bandwidth allocation, different request maps may be scaled to different powers of two. In this case, an additional look-up is performed (Table 5 in FIG. 10) to determine the length of the random number to be used. This is done by choosing an appropriate mask vector which hides the unnecessary most significant bits of the generated random number. The random number itself may be generated in a pipelined manner using a linear feedback shift register (LFSR), and must have as many bits as required by the case when all components are requesting access to the bus.

Comparison for grant generation: This is depicted in FIG. 10. The random number is compared in the comparators (one of which is marked 10.40) in parallel against all four partial sums. Each comparator outputs a '1' if the random number is less than the partial sum at the other input. Since for the same number, multiple comparators may output a '1' (e.g., if $r_1=1$ and the generated random number is smaller than $t_1$, all the comparators will emit '1'), it is necessary to choose the first one, starting with the first comparator. In the present example, for the request map 1011, (assuming no scaling, Table 1(a)) if the generated random number is 5, only $C_4$'s associated comparator will output a '1'. However, if the generated random number is '1', then all the comparators will output a '1', but the winner is $C_1$. This calls for a standard priority selector circuit 10.50 to ensure that, for a given set of requests, at the end of a lottery, exactly one grant line is asserted.

4. Hardware Implementation: Dynamic Assignment of tickets

Next, a hardware implementation for an example of a dynamic LOTTERYBUS architecture is presented. Here the steps in executing a lottery are the same as those mentioned above, but the problem is made considerably harder owing to the lack of lottery ticket assignment information at design time.

In this architecture, the inputs to the lottery-manager consist of a set of request lines ($r_1 r_2 r_3 r_4$) 11.10 and the number of tickets 11.20 currently possessed by each corresponding bus master (SoC component). Therefore, under this architecture, not only can the range of current tickets vary dynamically, it can take on any arbitrary value (unlike the static case, where it was confined to remain among a predetermined set of values).

Figure 11:
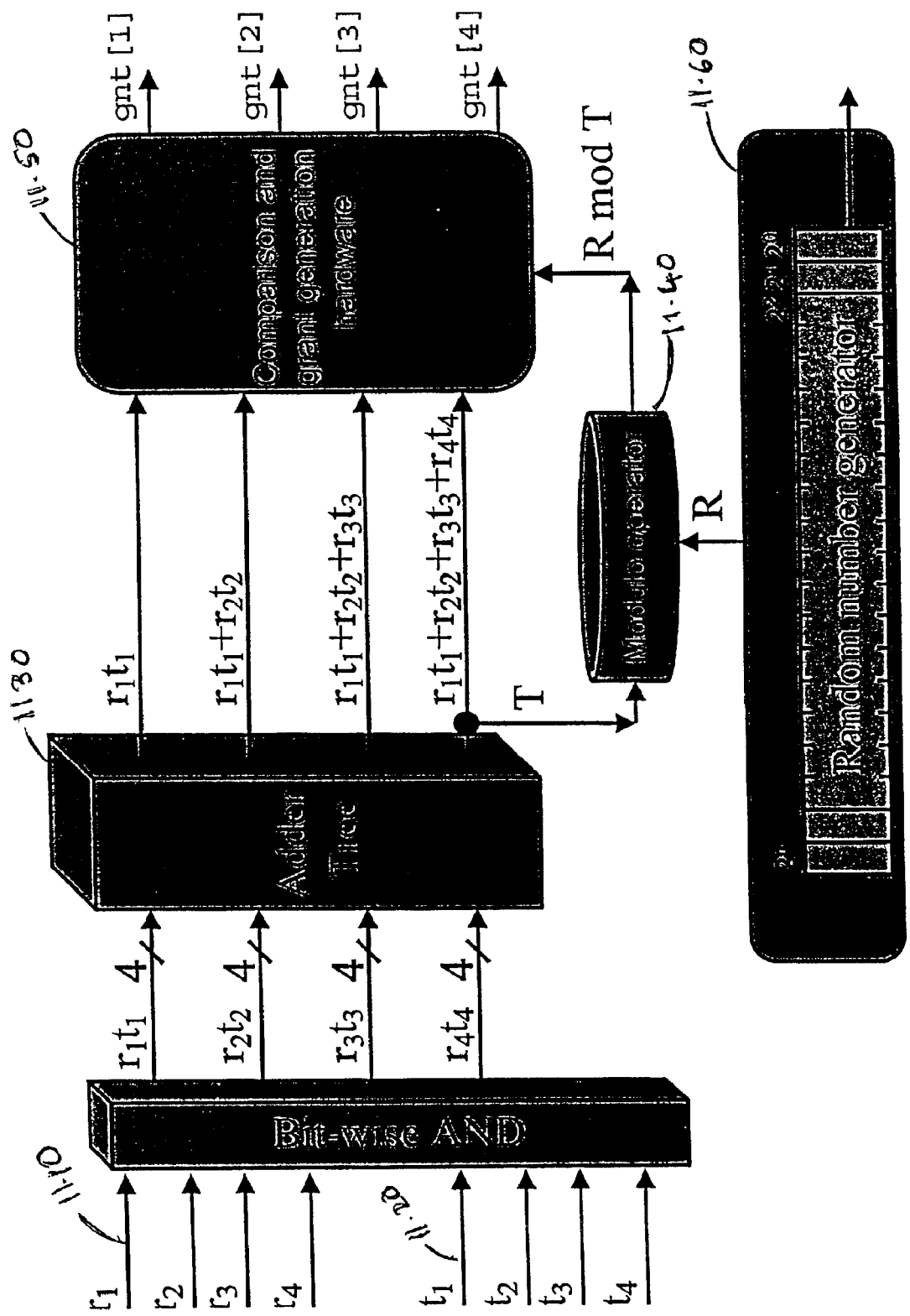
FIG. 11 shows an example lottery manager for an implementation of the disclosed techniques with dynamically assigned tickets.

Consequently, the lottery-manager needs to calculate for each component $C_i$, the partial sum $\Sigma_{j=1}^{i} r_j \cdot t_j$. This for $C_4$ yields the total range, given by the sum of the number of tickets held by all pending requests. This is implemented using a bitwise AND operation and a tree of adders 30, as shown in FIG. 11. The final result, $T = r_1 \cdot t_1 + r_2 \cdot t_2 + r_3 \cdot t_3 + r_4 \cdot t_4$ defines the range in which the random number must lie. The random number is generated in the range [0. T), using a random number generator 11.60 in combination with a modulo operator 11.40. The rest of the architecture consists of comparison and grant hardware 11.50, and follows directly from the design of the static lottery-manager.

IV.D. Results of Illustrative Experiments demonstrating the Advantages of the Disclosed Techniques In this section results of experiments that were carried out to evaluate the performance of the LOTTERYBUS architecture is presented. Initially, the experimental setup and performance evaluation framework is described. Next, a set of experiments to study the performance of the architecture across various types of on-chip communication traffic with widely varying characteristics is presented. Finally, the design of a the cell forwarding unit of a 4 port output-queued ATM switch that makes use of the LOTTERYBUS architecture is presented. The experimental results that demonstrate the advantages of the disclosed techniques are listed.

1. Experimental Framework

For the experiments, the POLIS [19]/PTOLEMY [20] system design environment was used. All system components were specified as a combination of Esterel and C, from which PTOLEMY simulation models were generated using POLIS; while schematic capture of the system components and subsequent HW/SW co-simulation were performed through the PTOLEMY graphical user interface.

Figure 12:
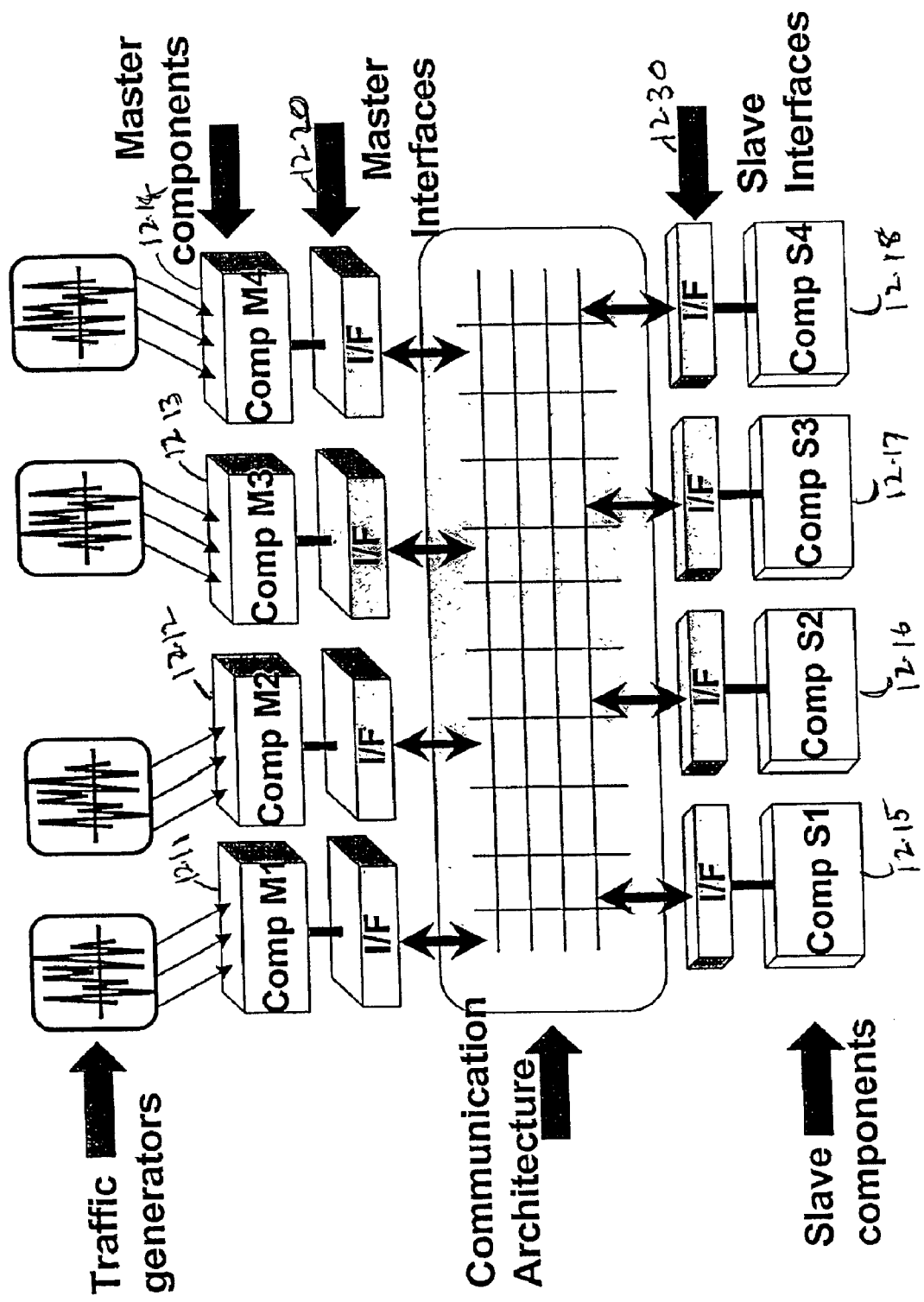
FIG. 12 shows an example top level system design for communication architecture performance evaluation.

FIG. 12 shows the top-level system used for evaluating the performance of each communication architecture considered in this paper. The system consists of 8 components exchanging variable quantities of data and control messages during the course of their execution. Components $M_1$ through $M_4$ shown as 12.11–12.14 are masters, each of which is connected to a parameterized traffic generator, while components $S_1$ through $S_4$ shown as 12.15–12.18 are slaves. The parameters of each traffic generator can be varied to control the characteristics of the communication traffic generated by the SoC component it is connected to.

Motivated by proposals for consistent core interfaces capable of supporting a variety of interconnect architectures such as the on-chip bus standards of the VSI alliance [4], and the Open Core Protocol [4] of Sonics Inc., the experimental system was designed using an architecture independent communication interface at the SoC component and communication architecture boundary. The master interfaces are shown as 12.20 and slave interfaces are shown as 12.30. Use of such a consistent interface allows the actual implementation of the communication architecture to remain transparent to the system components.

Figure 13:
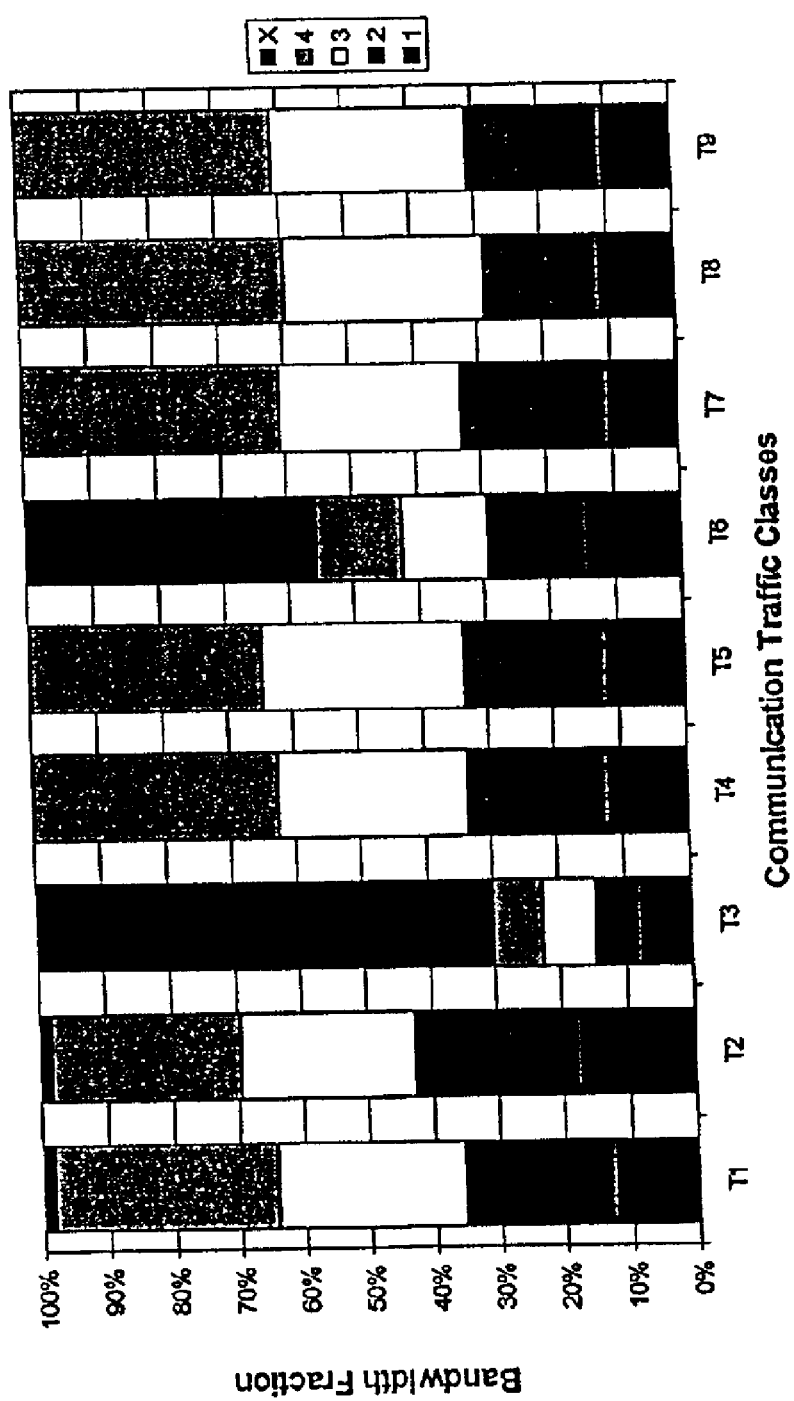
FIG. 13 shows performance of an example implementation of the disclosed techniques.

2. Performance of the Lottery Based Architecture Across the Communication Traffic Space The aim of the first set of experiments is to test the ability of LOTTERYBUS architecture to provide proportional bandwidth allocation for widely varying characteristics of the communication traffic on the bus. Several different types of traffic were generated. ranging from regular periodic traffic with large inter-request intervals, to random bursty traffic with high frequency of requests, by setting appropriate parameter values in the traffic generators. For each class of traffic, the system was simulated for a long sequence of input stimuli, and the bandwidth allocated to each SoC component was measured. The results are shown in FIG. 13. The x-axis depicts the nine different classes of communication traffic that were considered, the y-axis depicts the fraction of the total bus bandwidth allocated to various components, as well as the fraction that remains unutilized.

From FIG. 13, the following observations can be made:

In cases where the bus is saturated (T4,T5,T7,T8 and T9), the bandwidth allocation almost exactly follows the assignment of "lottery-priorities" or tickets. In these experiments, tickets are assigned in the ratio 1:2:3:4, and for these cases, the bandwidth allocated is (on the average) in the ratio 1.15:2.09:2.96:3.83.

In cases where the bus is partly unutilized, the allocation does not necessarily follow the assignment of tickets. For example. in cases T3 and T6 (30% and 55% bus utilization respectively) the allocation of bandwidth is more or less uniform among the various SoC components. This occurs because of the sparse nature of the communication traffic in these classes, which results in immediate grants being issued to the majority of the communication requests. When utilization approaches maximum, (Cases T1 and T2), the proportional sharing of the bus bandwidth becomes more evident.

The conclusion that can clearly be draw from the above experiment is that the LOTTERYBUS architecture is capable of providing efficient and fine grained control over allocation of the bus bandwidth over a variety of on-chip communication traffic classes, at varying levels of bus utilization.

In the second set of experiments, the performance of the LOTTERYBUS architecture, that embodies the disclosed techniques, and the TDMA based communication architecture is compared. Again, the traffic generators are used to create a set of classes of on-chip communication traffic. The performance metric that is considered for this experiment is the average latency (in clock cycles per word) of transferring a word across the bus. This includes the waiting time due to bus conflicts, the overhead of arbitration, and the time spent in executing the data transfer. In this experiment, the point of interest is in assessing and comparing the ability of the TDMA architecture and the LOTTERYBUS architecture in being able to provide low communication latencies to high priority traffic. Thus the traffic classes chosen included ones where one component makes frequent high priority burst requests. To study how the two architectures compare in being able to support such communications, the bursty component was assigned the most slots in the TDMA architecture, and the largest number of tickets in the LOTTERYBUS architecture. In fact. both the slot reservations in the TDMA wheel and the tickets were assigned in the ratio 1:2:3:4.

Figure 14A:
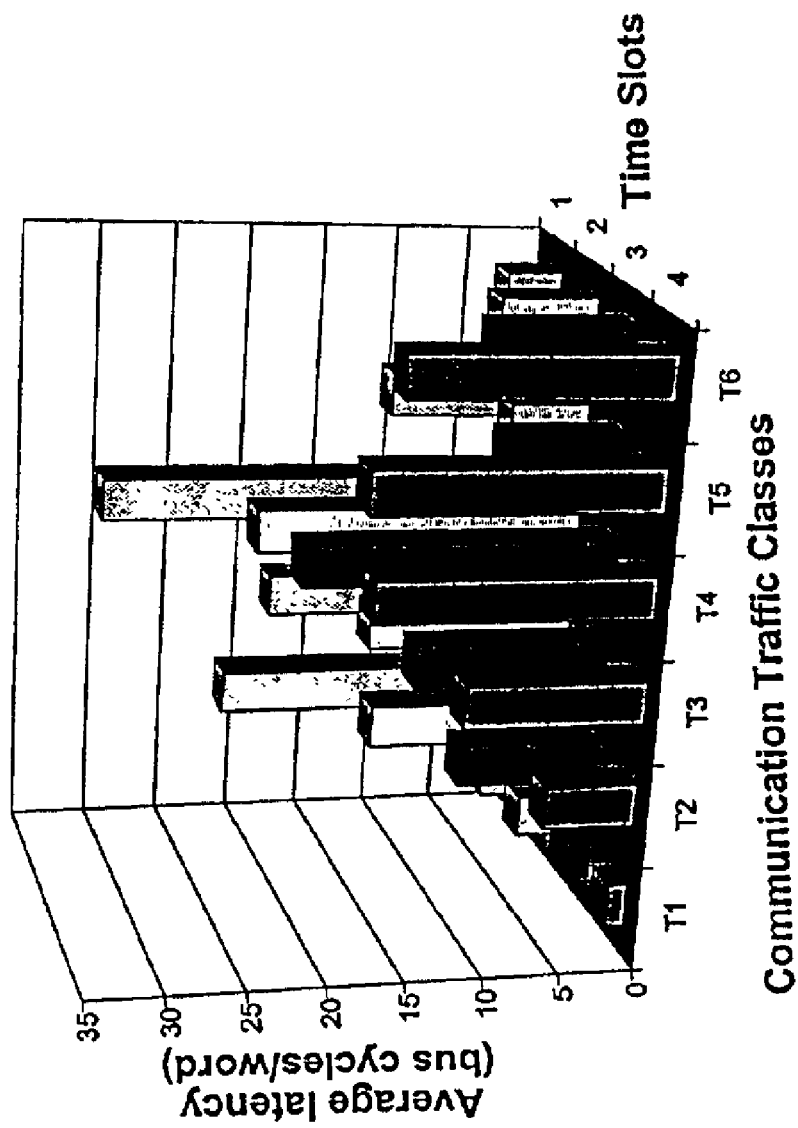
FIG. 14($a$) shows variation of communication latencies across different performance of the communication traffic space using a TDMA based communication architecture.

The performance of the TDMA architecture across 6 classes of traffic is shown in FIG. 14(a). The x-axis denotes several classes of on-chip communication traffic, the y-axis denotes different priorities. The z-axis measures the average per word latency of a component when assigned a particular priority under given conditions of on-chip communication traffic. For example, a component with priority 4, under conditions as created by traffic class T2, has an average latency of 6 bus cycles per word. From FIG. 14(a), the following observations are made:

Even for components with high priority, there is significant variation in the latency of its communications across the space of communication traffic classes under the TDMA based architecture. For example, the latency of a component with priority 3 varies from 1.65 cycles/word to 20.5 cycles/word. This shows that the latency of communications in the two-level TDMA based communication architecture is very sensitive to exact request patterns that occur in the on-chip traffic. One of the reasons for the large variation is that when communication requests arrive well synchronized with their re-served slots in the timing wheel, waiting times for access to the bus are minimized. However, the worse the synchronization is, the larger the waiting times become. In the worst case, a component may always "just miss" its slot, therefore incurring the overhead of waiting for a complete revolution of the wheel before gaining access to the bus.

Secondly, high priority burst transactions are not guaranteed to have low latency communications. In cases T5 and T6 the traffic consists of frequent bursts of communication requests from the highest priority component. In these cases, it can be seen that the TDMA based communication architecture makes the higher priority component incur an average latency that is larger than that incurred by a low priority component! For example, under T5, the component with priority 4 has an average latency of 11.1 cycles per word, which is about 2× larger than the per word latency of the component with next lower priority. A "priority inversions" under T6, can be witnessed, where the latencies exactly counter the priority assignments. The reason this occurs is that large transactions generated by high priority components are not served by the architecture in "burst mode", but periodically get forcibly interrupted by slots that are assigned to lower priority components. The problem may be mitigated somewhat by assigning n several consecutive slots to the same component. However, the limited advantage of this is illustrated by the experiments (the slots were assigned to facilitate 'burst' communications) and is explained as follows. If the burst request is larger (or several times larger) than n, the component will have to wait for multiple revolutions of the timing wheel before processing of its request is completed.

Figure 14B:
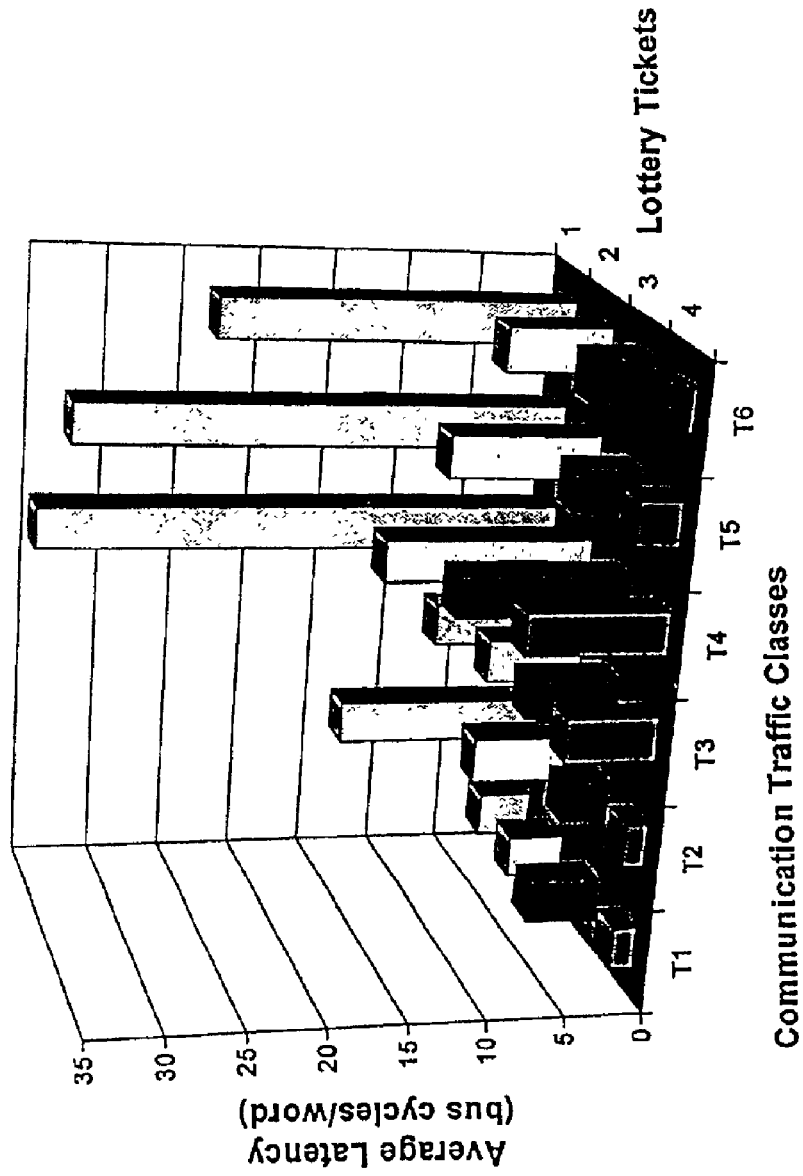

FIG. 14(b) illustrates the performance of the LOTTERYBUS communication architecture across the same set of traffic space points. From the figure, the following observations can be made:

Except under class T1, average latencies of the LOTTERYBUS communication architecture are appreciably lower for the high priority components. For example, under class T3, the average latency for a priority 4 component is 18 cycles/word under the TDMA based architecture, and 8.9 cycles/word under the LOTTERYBUS communication architecture.

The LOTTERYBUS communication architecture does not exhibit anomalies such as "priority inversion", rather the communication latencies respect the priorities of the components. Latencies for class T6 (not shown in the figure) followed the same pattern across priority levels.

The LOTTERYBUS communication architecture is able to deliver low latency communications to high priority bursty transactions. Average latency at priority level 4 under both T5 and T6 was 2.71 cycles/word. While the two-level TDMA based communication architecture provides the priority 4 component an average latency of 18.55 cycles/word for bursty traffic, (T5 and T6), the LOTTERYBUS communicate architecture allows it to communicate at an average of 2.7 cycles per word, a 7× improvement. However, average latencies under T6 (not shown in figure) for lower priority components were larger than T5. This is because T6 has higher levels of contention than T5, causing larger waiting times for low priority components.

3. Example System: Cell Forwarding in an Output-queued ATM switch

Figure 15:
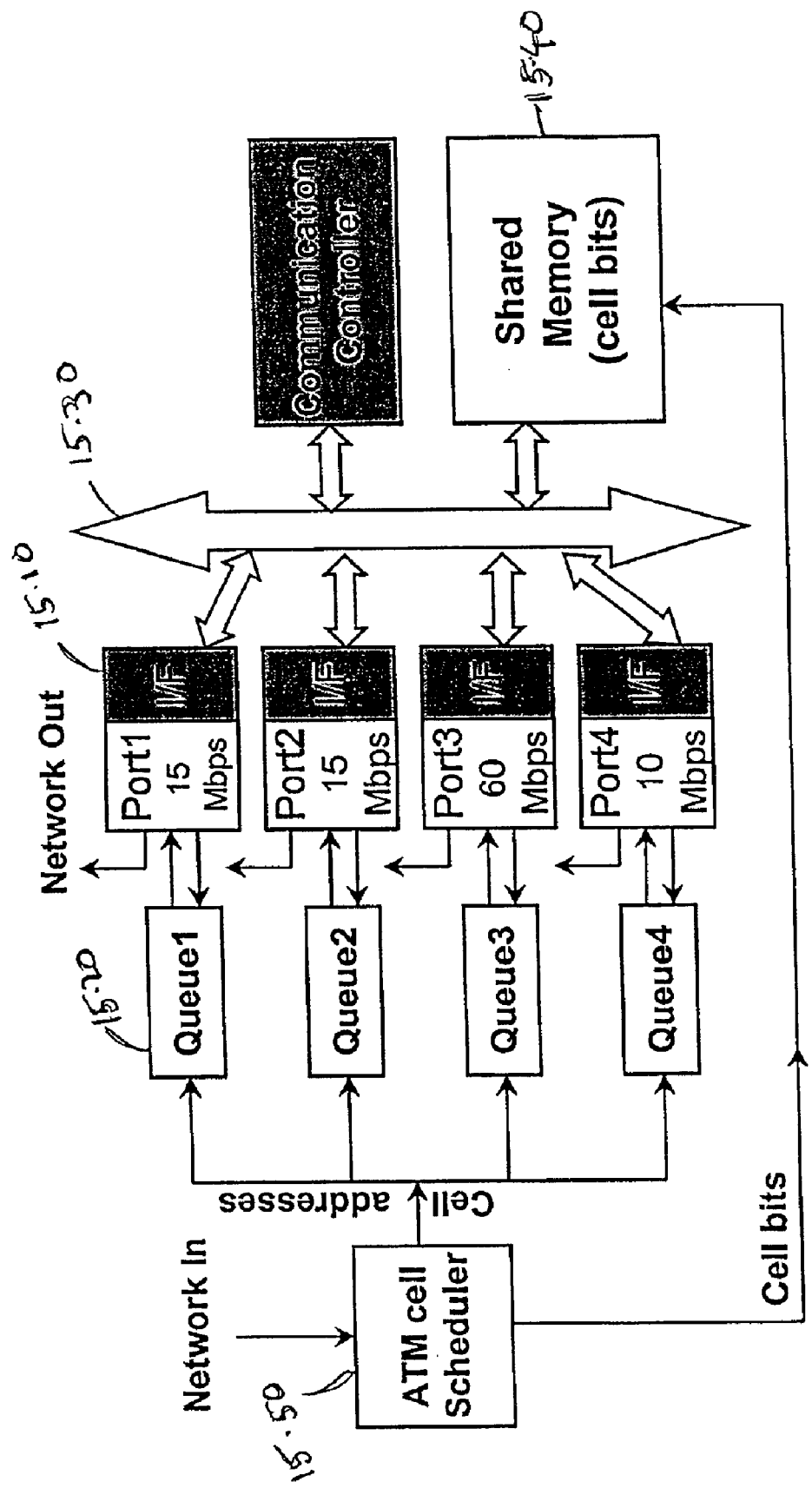
FIG. 15 show an example implementation of the disclosed techniques in a cell forwarding unit of a 4 port output-queued ATM switch

The LOTTERYBUS architecture, embodying the disclosed techniques, is used in the design of the cell forwarding unit of an output-queued ATM switch (shown in FIG. 15). The system consists of 4 output ports, one of which is shown as 15.10, each with a dedicated small local memory (not shown in the figure) that stores queued cell addresses. Arriving cell bits are written to a dual-ported shared memory 15.40, while the starting address of each cell is written to an appropriate output queue by a scheduler 15.50. Each port polls its queue, to detect presence of a cell. For example, port 15.10 polls queue 15.20. If it is non-empty, the port issues a dequeue signal to its local memory, and contends for access to the shared system bus 15.30. Once it acquires the bus, it extracts the relevant cell from the shared memory 15.40, and forwards it onto the output link.

In these experiments, the cells passing through the switch had a set of strict quality-of-service requirements. For example, traffic bound for the various output links have distinct bandwidth reservations, as shown in FIG. 15. The bandwidth reservations require that the shared bus be shared by the various output ports in the ratio 10:60:15:15. In addition, each cell that is bound for output link 4, must also be processed by the switch with minimum latency (this requirement could arise from applications such as media streaming or voice, in which cells are required to meet real-time deadlines). The arrival patterns of the cells destined for output links 1,2 and 3 are frequent and regular, such that often, the corresponding queues are back logged. Cell arrivals for output link 4 are bursty in nature, arriving at large intervals, but in groups of several cells at a time.

Three variants of the system are implemented, based on the type of communication architecture used. The performance of the system under these performance requirements and traffic conditions are compared, for each of the three architectures considered in this paper: the static priority based architecture, the two-level TDMA based architecture, and the LOTTERYBUS architecture. The parameters of each architecture were chosen as follows. For each architecture, priorities were assigned in a consistent manner, with the highest priority begin assigned to port 4 (which has bursty traffic with low latency requirement), the next highest to port 3 (which requires 60% of the bus bandwidth), and so on. This translates to a simple assignment of integer priorities in the case of the static priority based shared bus, and appropriate assignments of timing wheel slots (in the case of the TDMA based architecture), and tickets (in the case of LOTTERYBUS architecture). For fair comparison, the total number of slots in the timing wheel were made identical to the number of tickets in the lottery. 50 out of a total of 100 slots (tickets) were assigned to output port 4, while the remaining slots (ticket) were assigned in the ratio 4:1:1. Thus port 1 gets 50 slots (tickets), port 2 gets 34, port 3 and port 4 each get 8. In addition, the maximum burst size for the LOTTERYBUS and static priority based architectures were identical.

TABLE 2

Comparative performance of alternative communication architectures for the ATM switch

| Comm. Arch. | Port 4 Latency (cycles/ word) | Port 4 BW fraction (%) | Port 3 BW fraction (%) | Port 2 BW fraction (%) | Port 1 BW fraction (%) |
| --- | --- | --- | --- | --- | --- |
| Static priority | 1.39 | 9.69 | 45.72 | 44.58 | 0.01 |
| Two level TDMA | 9.84 | 10.09 | 47.29 | 21.31 | 21.30 |
| Lottery | 1.4 | 9.67 | 59.03 | 17.00 | 14.30 |

The results of the experiments are shown in Table 2. The columns denote performance metrics for each output port (bandwidth fraction and latency for Port 4, and only bandwidth fraction for Ports 3,2,1). The rows denote the performance under each alternative communication architecture. For example, Port 3 receives 59% of the total bus bandwidth under the LOTTERYBUS architecture. From the table, the following observations can be made:

Latency of high priority traffic at Port 4 is minimum under the static priority based architecture (1.39 cycles per word), while it is 7 times larger under the two-level TDMA based architecture (9.84 cycles per word). Under the LOTTERYBUS architecture, the average latency (1.4 cycles per word), is comparable to that under the static priority based architecture.

The bus bandwidth apportioned to the various ports under the static priority based architecture does not respect the reservations. In fact, Port 1 receives only 0.1% of the total bandwidth, being the lowest priority component. The same is true for the TDMA architecture. In row 2 we observe that Port 3 receives only 47% of the total bandwidth, while it had originally reserved 60%. The reason this occurs is because during periods when Port 4 has no cells to send, its slots are made available to the other ports in a round robin manner, using the second level of arbitration. Thus Ports 2 and 1 receive more than their reserved share of bandwidth, which decreases the relative fraction allocated to Port 2. However, it is observed in row 3, that the bandwidth assignments in the case of the LOTTERYBUS architecture closely match the reservations.

The results demonstrate that while the static priority based architecture is capable of providing low latencies for traffic with real time deadlines, it is not suited to proportionally sharing the total communication bandwidth. The two-level TDMA architecture not only cannot guarantee low latencies for real time traffic, but also may not be able to provide bandwidth guarantees when one or more components have bursty request patterns. However, the LOTTERYBUS architecture is shown to be capable of (a) providing low latencies for bursty traffic with real time latency constraints, as well as (b) providing effective bandwidth guarantees for traffic generated by each system component.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A circuit comprising:
    a plurality of components sharing at least one shared resource, and
    a lottery manager, the lottery manager being adapted to receive request for ownership for said at least one shared resource from a subset of the plurality of components,
    each of the subset of the plurality of components being assigned lottery tickets,
    the lottery manager being adapted to probabilistically choose one component from the subset of the plurality of components for assigning said at least one shared resource, and
    the probabilistically choosing being weighted based on a number of lottery tickets being assigned to each of the subset of the plurality of components.

2. The circuit of claim 1, wherein the circuit is a system on chip.

3. The circuit of claim 2, wherein the subset of the plurality of components are system on chip masters that can drive a communication transaction.

4. The circuit of claim 1, wherein the shared resource is a bus.

5. The circuit of claim 4, wherein each component from the subset of the plurality of components has a preassigned share of bandwidth.

6. The circuit of claim 4, wherein a component from the subset of the plurality of components can request allocation of the bus for transferring multiple words.

7. The circuit of claim 6, wherein a maximum limit is placed on a number of bus cycles that can be allotted to a component.

8. The circuit of claim 1, wherein the shared resource is a communication channel.

9. The circuit of claim 1, wherein an assignment of lottery tickets is based on assigning priorities among the subset of the plurality of components, with a component having a highest priority receiving a maximum number of lottery tickets.

10. The circuit of claim 1, wherein operations of the lottery manager are pipelined with actual data transfers to minimize idle bus cycles.

11. The circuit of claim 1, wherein a number of tickets assigned to each of the subset of the plurality of components is statically chosen.

12. The circuit of claim 11, wherein the number of tickets to be assigned to each of the subset of the plurality of components is stored apriori in the lottery manager.

13. The circuit of claim 11, wherein the lottery manager further comprises:
    a range calculator adapted to calculate a range between 0 and a positive number, the range being for each of the components in the subset of the plurality of components, the range corresponding to the number of lottery tickets held by said each of the components;
    a random number generator adapted to generate a random number between zero and the positive number;
    a set of look up tables, that store ranges calculated for the subset of components;
    a comparator adapted to compare the random number with the ranges; and
    a priority selector that selects a grant component from the subset of components based on the comparison performed in the comparator.

14. The circuit of claim 13 where the positive number is a total number of all lottery tickets held by the subset of components which have pending requests.

15. The circuit of claim 13, wherein the random number generator is a linear feedback shift register.

16. The circuit of claim 1, wherein a number of tickets assigned to each of the subset of the plurality of components is dynamically chosen.

17. The circuit of claim 16, wherein the lottery manager further comprises:
    a bitwise AND calculator adapted to receive a set of request lines corresponding to the subset of components and a number of tickets currently possessed by each of the subset of components;
    a range calculator adapted to calculate a range between 0 and a positive number, for each of the components in the subset of the plurality of components, the range corresponding to the number of lottery tickets held by said each of the components;
    a random number generator adapted to generate a random number;
    a modulo operator adapted to perform a modulo operation based on the random number and a sum of the ranges to create a number between zero and the positive number;
    a comparator adapted to compare a result of the modulo operation and the ranges; and
    a priority selector that selects a grant component from the subset of components based on the comparison performed in the comparator.

18. A method of assigning a shared resource to competing components in a circuit, said method comprising:
   (a) determining priority from among the competing components;
   (b) assigning lottery tickets to the competing components, with a number of lottery tickets being proportional to the priority of the competing components.
   (c) probabilistically selecting a component based on the number of lottery tickets; and
   (d) assigning the shared resource to the component.

19. The method of claim 18 wherein hybrid static priority technique is used in conjunction with other resource allocation techniques.

20. The method of claim 18 wherein time division multiplexing technique is used in conjunction with other resource allocation techniques.

* * * * *